United States Patent [19]

Saho et al.

[11] Patent Number: 5,098,981
[45] Date of Patent: Mar. 24, 1992

[54] POLYORGANOSILOXANE

[75] Inventors: Takahiro Saho; Yoshinori Akutsu; Takaharu Nakano; Nobumasa Ohtake, all of Kanagawa, Japan

[73] Assignee: Chisso Corporation, Osaka, Japan

[21] Appl. No.: 652,376

[22] Filed: Feb. 7, 1991

Related U.S. Application Data

[63] Continuation of Ser. No. 374,304, Jun. 30, 1989, abandoned.

[30] Foreign Application Priority Data

Jun. 30, 1988 [JP] Japan .................................. 63-160660

[51] Int. Cl.$^5$ .............................................. C08G 77/20
[52] U.S. Cl. ......................................... 528/32; 528/42; 556/440; 556/454
[58] Field of Search ................. 528/32, 42; 556/440, 556/454

[56]  References Cited

U.S. PATENT DOCUMENTS

| | | | |
|---|---|---|---|
| 3,377,371 | 4/1968 | Quaal | 260/448.2 |
| 4,029,629 | 6/1977 | Jeram | 260/46.5 |
| 4,348,531 | 9/1982 | Evans | 556/453 |
| 4,384,100 | 5/1983 | Takamizawa et al. | 528/41 |
| 4,658,049 | 4/1987 | Nakano et al. | 556/437 |
| 4,727,172 | 2/1988 | Yamamoto et al. | 556/440 |

FOREIGN PATENT DOCUMENTS 59-78236  5/1984  Japan .

OTHER PUBLICATIONS

Oshibe; Patent Abstracts of Japan, 13, No. 19 (C-579; 3467) 23 Mar. 1989.
Okawa; Patent Abstracts of Japan, 13, No. 379 (C-628; 3727) 2 Aug. 1989.

Primary Examiner—Melvyn I. Marquis
Attorney, Agent, or Firm—Leydig, Voit & Mayer

[57] ABSTRACT

A novel polyorganosiloxane is provided which has a fluorine atom-containing substituent at one terminal of its molecular chain and an unsaturated double bond-containing substituent at the other terminal thereof. The polyorgansiloxane of the present invention is represented by the general formula (I)

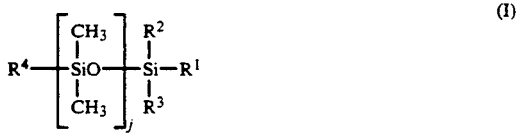

wherein j is an integer of 1 to 2000, and $R^1$ is an unsaturated double bond-containing group, each of $R^2$ and $R^3$ is an alkyl group having 1 to 4 carbon atoms, phenyl group, vinyl group, straight-chain or branched alkenyl group having 3 to 20 carbon atoms, or a siloxane chain which is similar to

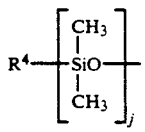

and $R^4$ is a fluorine atom-containing substituent,

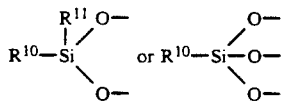

wherein $R^{10}$ is similar to $R^4$ and is the fruorine atom-containing substituent, $R^{11}$ is an alkyl group having 1 to 4 carbon atoms or phenyl group, and the oxygen atoms sited on the right side of the above formulae are combined with a siloxane chain having the unsaturated double bond-containing substituent at the terminal thereof which is similar to

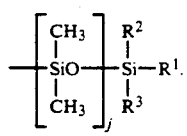

3 Claims, 12 Drawing Sheets

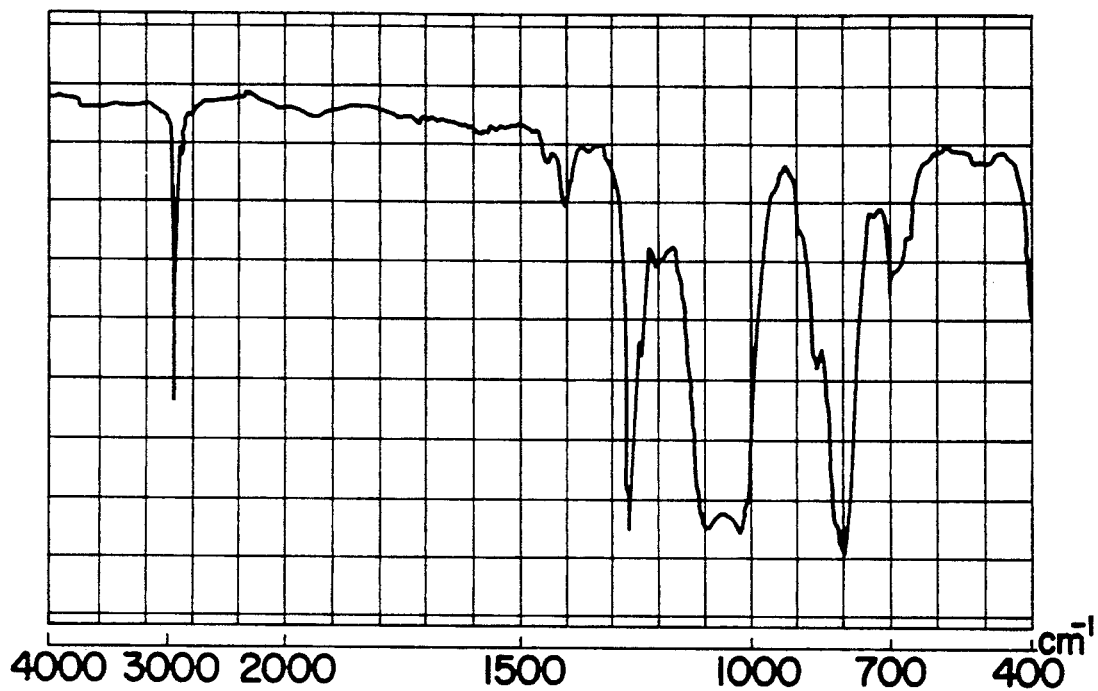
F I G. 5
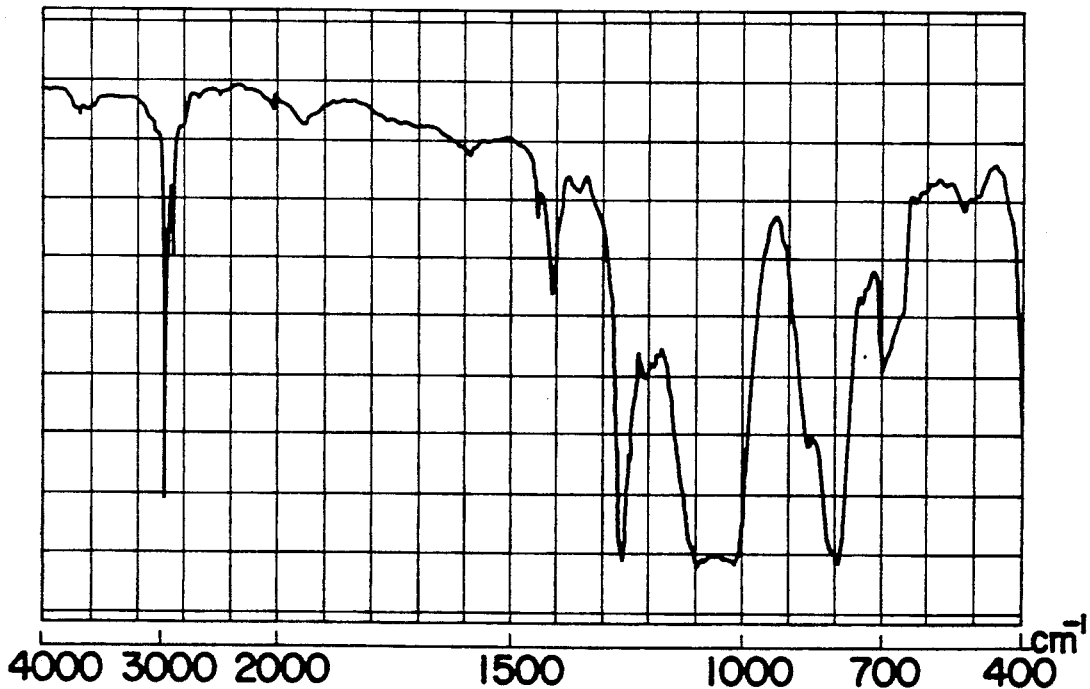
F I G. 6

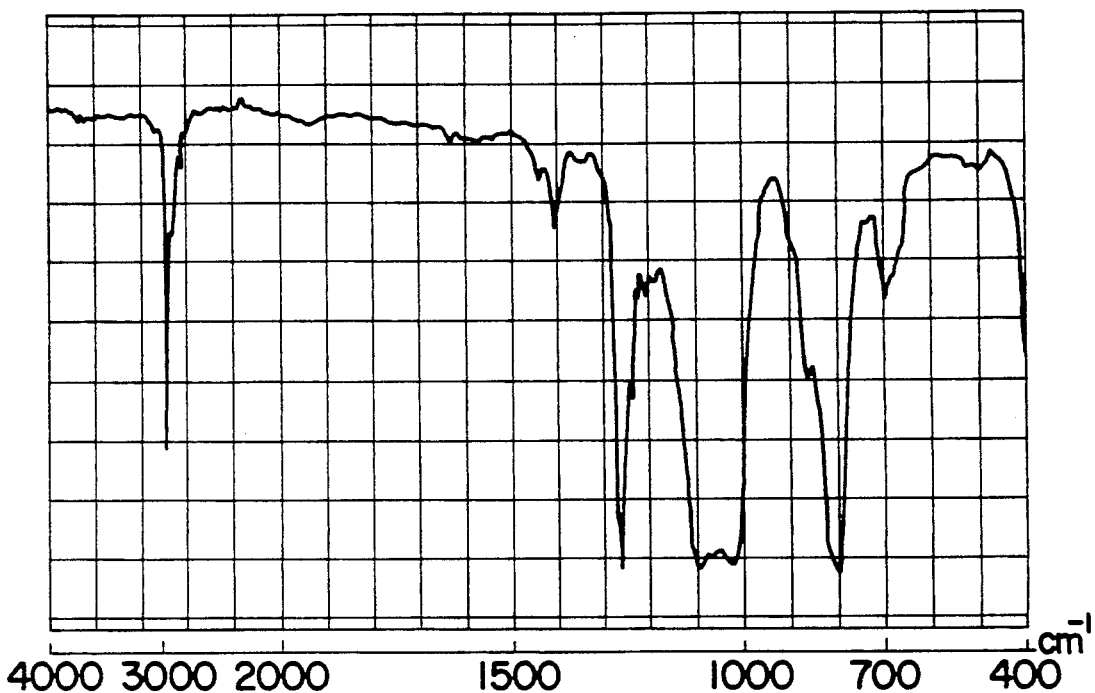
F I G. 11
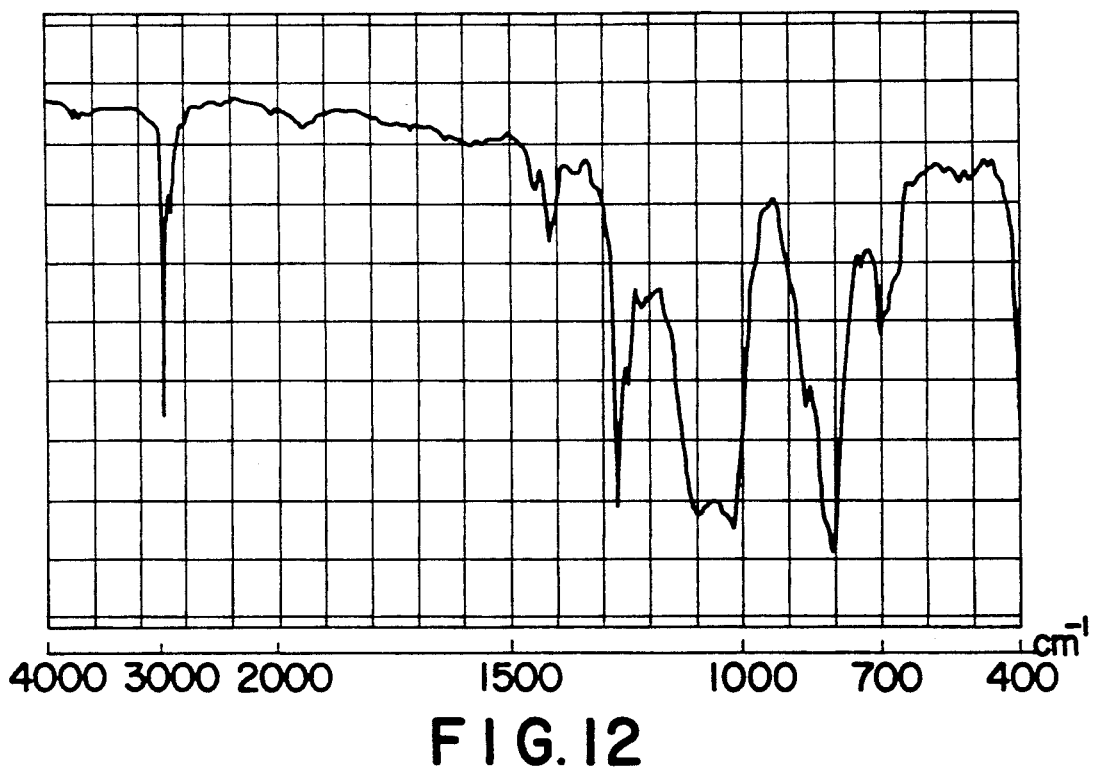
F I G. 12

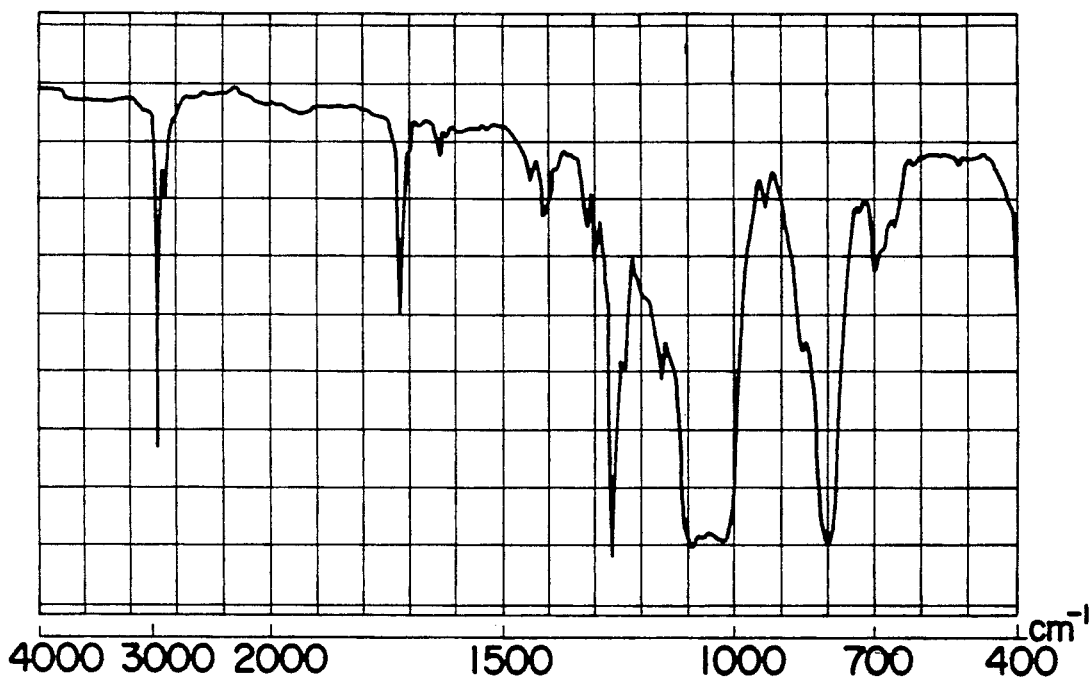
F I G. 23

POLYORGANOSILOXANE

This application is a continuation of application Ser. No. 07/374,304, filed June 30, 1989 and now abandoned.

BACKGROUND OF THE INVENTION (1) Field of the Invention

The present invention relates to a novel polyorganosiloxane suitable for the modification of silicone rubbers and synthetic resins.

(2) Description of the Prior Art

Heretofore, a fluorine-containing group has been introduced into silicone rubbers for the purpose of improving oil resistance and solvent resistance. A typical example of the fluorine-containing group is a 3,3,3-trifluoropropyl group, and the fluorine-containing group is usually introduced into a pendant site (branch site of a polysiloxane chain). Such fluorosilicone rubbers have been used singly and in the form of blends and copolymers of these rubbers and ordinary silicone rubbers.

Furthermore, polyorganosiloxanes have been used in synthetic resins with the intention of providing molded articles of the synthetic resins with interfacial characteristics such as water repellency, release properties and stain resistance as well as other characteristics such as heat resistance which the polyorganosiloxanes have. In these polyorganosiloxanes, the straight-chain polysiloxanes are mainly used. The polysiloxane compound not having any group which is reactive with a synthetic resin is introduced into the synthetic resin by blending them, and the polyorganosiloxane having the group which is reactive therewith is introduced thereinto by chemical bond. The polyorganosiloxane can be also used as a raw material of graft polymers for the modification of the synthetic resin to which much attention is paid of late, and particularly in this case, the so-called monofunctional polyorganosiloxane has been used in which one terminal alone has a functional group and another terminal is terminated with an alkyl group.

However, when the fluorine-containing substituent is introduced at the pendant site as in conventional silicone rubbers, the fluorine-containing substituent is uniformly present in molded or coated products, and therefore a great deal of the fluorine-containing substituent is required to obtain the expected effect. In addition, there are also troubles due to poor miscibility and a problem such as the bad influence of the substituents on other physical properties.

Also when the polyorganosiloxane is used for the purpose of improving the specific characteristics of the synthetic resin, the improvement depends upon the function of the polysiloxane. Thus, the degree of improvement of the synthetic resin is insufficient in view of the fact that the demand of the specific characteristics is now increased. Moreover, in order to obtain the characteristics sought, a great deal of the polyorganosiloxane is required, which leads to the problem that the other physical properties are adversely affected. The monofunctional polyorganosiloxane also has similar disadvantages, because the other terminal of the molecular chain which has no functional group for the synthetic resin is terminated with the trimethylsiloxy group. In addition, specific properties such as oil repellency are scarcely improved by the polydimethylsiloxane alone in which the other terminal is terminated with an alkyl group.

SUMMARY OF THE INVENTION

An object of the present invention is to provide a novel polyorganosiloxane having a portion with a fluoroalkyl group at one molecular chain terminal thereof and a portion with a functional group at the other molecular chain terminal in its one molecule, which compound can solve the above-mentioned problems.

The present inventors have intensively conducted research to achieve the above-mentioned objects, and they have prepared polyorganoxiloxanes having at least one fluorine atom-containing substituent at an $\alpha$-($\alpha'$- or $\alpha''$-)position and having an unsaturated double bond-containing substituent at a $\omega$-($\omega'$- or $\omega''$-)position.

That is, the first feature of this invention is directed to a polyorganosiloxane represented by the general formula (I)

(I)

wherein j is an integer of 1 to 2000, and $R^1$ is a vinyl group, allyl group, m-ethenylphenyl group, o-ethenylphenyl group, p-ethenylphenyl group, m-ethenylphenylmethyl group, o-ethenylphenylmethyl group, p-ethenylphenylmethyl group, $\beta$-(m-ethenylphenyl)ethyl group, $\beta$-(o-ethenylphenyl)ethyl group, $\beta$-(p-ethenylphenyl)ethyl group, or a substituent which is a straight-chain or branched alkenyl group having an unsaturated double bond at its terminal end represented by the formula (II)

$$CH_2=CHC_aH_{2a} \qquad (II)$$

wherein a is an integer of 2 to 18, each of $R^2$ and $R^3$ is an alkyl group having 1 to 4 carbon atoms, phenyl group, vinyl group, allyl group or a substituent represented by the above-mentioned formula (II), and $R^4$ is a pentafluorophenyl group, 3-(heptafluoroisopropoxy)-propyl group, 1,1,2,2-tetrafluoroethyl group or a substituent which is a straight-chain or branched fluoroalkyl group represented by the formula (IV)

$$C_bH_cF_{2b-c+1} \qquad (IV)$$

wherein b is an integer of 3 to 18, and c is an integer of 0 to 2b.

The second feature of this invention is directed to a polyorganosiloxane represented by the general formula (I) regarding the first feature of this invention in which the substituent represented by $R^4$ is a 3,3,3-trifluoropropyl group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl The third feature of this invention is directed to a polyorganosiloxane having an at least one fluorine atom-containing substituent in its molecule and represented by the general formula (III)

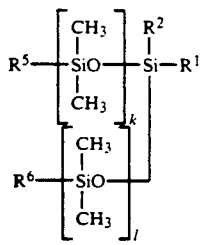

(III)

wherein each of k and l is an integer of 1 to 2000, $R^1$ and $R^2$ are the same meaning as described above, and each of $R^5$ and $R^6$ is an alkyl group having 1 to 4 carbon atoms, vinyl group, allyl group, pentafluorophenyl group, 3-(heptafluoroisopropoxy)propyl group, 1,1,2,2-tetrafluoroethyl group, a substituent represented by the above-mentioned formula (II) or a substituent represented by the above-mentioned formula (IV) and at least one of $R^5$ and $R^6$ is a fluorine atom-containing substituent of the above-mentioned groups.

The fourth feature of this invention is directed to a polyorganosiloxane represented by the general formula (III) regarding the third feature of this invention in which at least one of the substituent represented by $R^5$ and $R^6$ is a 3,3,3-trifluoropropyl group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl group.

The fifth feature of this invention is directed to a polyorganosiloxane represented by the general formula (V)

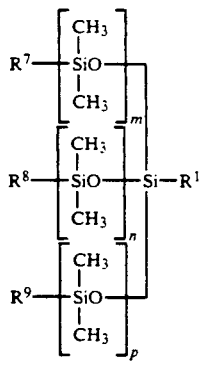

(V)

wherein each of m, n and p is an integer of 1 to 2000, $R^1$ is the same meaning as described above, and each of $R^7$, $R^8$ and $R^9$ is an alkyl group having 1 to 4 carbon atoms, vinyl group, allyl group, pentafluorophenyl group, 3-(heptafluoroisopropoxy)propyl group, 1,1,2,2-tetrafluoroethyl group, a substituent represented by the above-mentioned formula (II) or a substituent represented by the above-mentioned formula (IV), and at least one of $R^7$, $R^8$ and $R^9$ is a fluorine atom-containing substituent of the above-mentioned groups.

The sixth feature of this invention is directed to a polyorganosiloxane represented by the general formula (V) regarding the fifth feature of this invention in which at least one of the substituent represented by $R^7$, $R^8$ and $R^9$ is a 3,3,3-trifluoropropyl group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl group.

The seventh feature of this invention is directed to a polyorganosiloxane having an at least one unsaturated double bond-containing substituent in its molecule and represented by the general formula (VI)

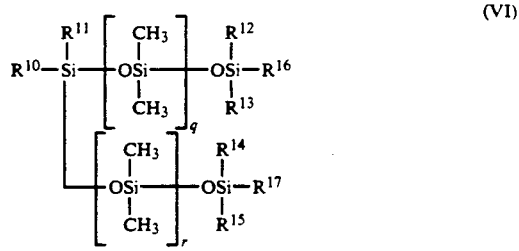

(VI)

wherein each of q and r is an integer of 0 to 2000, and $R^{10}$ is a pentafluorophenyl group, 3-(heptafluoroisopropoxy)propyl group, 1,1,2,2-tetrafluoroethyl group or a substituent group represented by the above-mentioned formula (IV), $R^{11}$ is a substituent which is an alkyl group having 1 to 4 carbon atoms or phenyl group, each of $R^{12}$, $R^{13}$, $R^{14}$ and $R^{15}$ is an alkyl group having 1 to 4 carbon atoms, phenyl group, vinyl group, allyl group or a substituent represented by the above-mentioned formula (II), each of $R^{16}$ and $R^{17}$ is an alkyl group having 1 to 4 carbon atoms, vinyl group, allyl group, m-ethenylphenyl group, o-ethenylphenyl group, p-ethenylphenyl group, m-ethenylphenylmethyl group, o-ethenylphenylmethyl group, p-ethenylphenylmethyl group, $\beta$-(m-ethenylphenyl)ethyl group, $\beta$-(o-ethenylphenyl)ethyl group, $\beta$-(p-ethenylphenyl)ethyl group or a substituent represented by the above-mentioned formula (II), but at least one of $R^{12}$ to $R^{17}$ is an unsaturated double bond-containing group of the above-mentioned groups.

The eighth feature of this invention is directed to a polyorganosiloxane represented by the general formula (VI) regarding the seventh feature of this invention in which the substituent represented by $R^{10}$ is a 3,3,3-trifluoropropyl substituent represented group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl group.

The ninth feature of this invention is directed to a polyorganosiloxane represented by the general formula (VII)

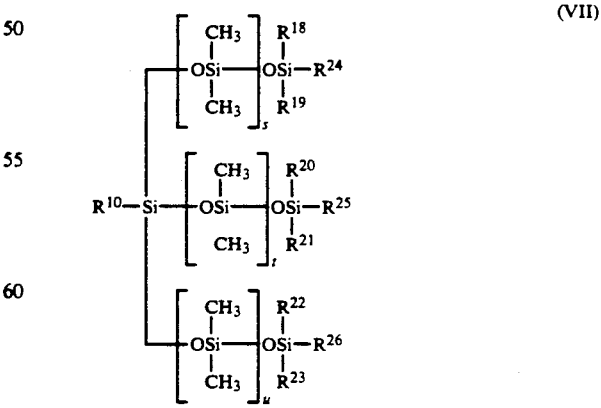

(VII)

wherein each of s, t and u is an integer of 1 to 2000, and $R^{10}$ has the same meaning as described above, each of $R^{18}$, $R^{19}$, $R^{20}$, $R^{21}$, $R^{22}$ and $R^{23}$ is an alkyl group having 1 to 4 carbon atoms, phenyl group, vinyl group, allyl group or a substituent which is a straight-chain or branched alkenyl represented by the above-mentioned formula (II), each of $R^{24}$, $R^{25}$ and $R^{26}$ is an alkyl group having 1 to 4 carbon atoms, vinyl group, allyl group, m-ethenylphenyl group, o-ethenylphenyl group, p-ethenylphenyl group, m-ethenylphenylmethyl group, o-ethenylphenylmethyl group, p-ethenylphenylmethyl group, β-(m-ethenylphenyl)ethyl group, β-(o-ethenylphenyl)ethyl group, β-(p-ethenylphenyl)ethyl group or a substituent represented by the above-mentioned formula (II), but at least one of $R^{18}$ to $R^{26}$ is an unsaturated double bond-containing substituent of the above-mentioned groups.

The tenth feature of this invention is directed to a polyorganosiloxane represented by the general formula (VII) regarding the ninth feature of this invention in which the substituent represented by $R^{10}$ is a 3,3,3-trifluoropropyl group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl group.

The eleventh feature of this invention is directed to a polyorganosiloxane represented by the general formula (I) regarding the first feature of this invention in which the substituent represented by $R^1$ has the formula (VIII)

wherein $X^1$ is a hydrogen atom or methyl group.

The twelfth feature of this invention is directed to a polyorganosiloxane represented by the general formula (III) regarding the third feature of this invention in which the substituent represented by $R^1$ has the above-mentioned formula (VIII).

The thirteenth feature of this invention is directed to a polyorganosiloxane represented by the general formula (V) regarding the fifth feature of this invention in which the substituent represented by $R^1$ has the above-mentioned formula (VIII).

The fourteenth feature of this invention is directed to a polyorganosiloxane represented by the general formula (VI) regarding the seventh feature, of this invention in which at least one of the substituents represented by $R^{16}$ and $R^{17}$ has the above-mentioned formula (VIII).

The fifteenth feature of this invention is directed to a polyorganosiloxane represented by the general formula (VII) regarding the ninth feature of this invention in which at least one of the substituents represented by each of $R^{24}$, $R^{25}$ and $R^{26}$ has the above-mentioned formula (VIII).

BRIEF DESCRIPTION OF THE DRAWINGS

FIGS. 5 to 23 are IR charts of siloxane compounds prepared in Examples 4 to 22 of the present invention.

DETAILED DESCRIPTION OF THE INVENTION

Figure 1:
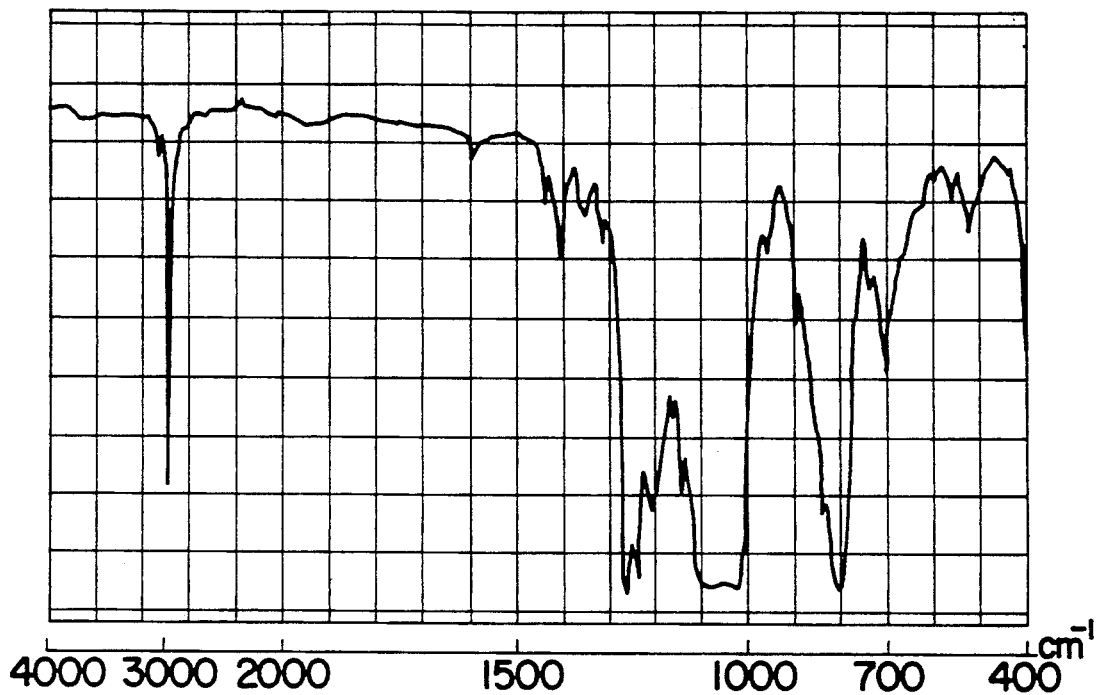
FIGS. 1 to 3 are IR charts of siloxane compounds prepared in Examples 1 to 3 of the present invention.

The inventors of the present application have realized that the above-mentioned problems can be overcome by the polyorganosiloxanes just referred to.

The polyorganosiloxanes represented by the general formula (I) regarding the first feature, the general formula (III) regarding the third feature, the general formula (V) regarding the fifth feature, the general formula (VI) regarding the seventh feature and the general formula (VII) regarding the ninth feature of this invention are characterized by having a terminal portion of an unsaturated double bond-containing substituent and another terminal portion of a fluorine atom-containing substituent simultaneously in one molecule thereof, as is apparent from the above general formulae. This constitution is maintained even in the high-molecular polymer in which each value of j in the general formula (I), k and ( in the general formula (III), m, n and p in the general formula (V), q and r in the general formula (VI) and s, t and u in the general formula (VII) has a great value, and each of the molecules constituting the polymer has the terminal portion of the unsaturated double bond-containing substituent and the other terminal portion of the fluorine atom-containing substituent in the one molecule thereof Additionally, the polymer of the present invention is characterized in that its dispersity is from 1.1 to 1.2 in a preferable case, which means that the distribution of the molecular weight is controlled very well.

Each value of j in the general formula (I), k and ( in the general formula (III), m, n and p in the general formula (V), q and r in the general formula (VI) and s, t and u in the general formula (VII) indicates the number of dimethylsiloxane units in a polydimethylsiloxane straight-chain portion, and the value is preferably in the range of 1 to 2000 in the case of j, k, (, m, n and p, and 0 to 2000 in the case of q, r, s, t and u so as to surely exert the specific function of the polydimethylsiloxane when the polyorganosiloxane is introduced into a silicone rubber or a synthetic resin, to facilitate the introduction of the compound into the synthetic resin, and to facilitate the synthesis of the compound itself.

In the case that each polyorganosiloxane of the present invention represented by the general formula (I) regarding the first invention, the general formula (III) regarding the third invention, the general formula (V) regarding the fifth invention, the general formula (VI) regarding the seventh invention and the general formula (VII) of the ninth invention is introduced into a silicone rubber or a synthetic resin, each value of j in the general formula (I), k and ( in the general formula (III), m, n and p in the general formula (V), q and r in the general formula (VI) and s, t and u in the general formula (VII) is preferably 700 or less, depending upon the kind of structure of the polyorganosiloxane of the present invention to be used, the kind of synthetic resin sought, the characteristics of the polymer and the desired function.

In the alkenyl group having the unsaturated double bond represented by the formula (II) in the first, third, fifth, seventh and ninth features of this invention, the parameter a is preferably in the range of 3 to 18 for the sake of the easy availability of a raw material, the effective exertion of function and the ease of synthesis.

Furthermore, in the fluoroalkyl group represented by the formula (IV) in the first, third, fifth, seventh and ninth features of this invention, the parameter b is preferably in the range of 3 to 18 for the sake of the easy availability of the raw material, the effective exertion of the function which the fluoroalkyl group has, and the ease of synthesis.

The polyorganosiloxanes of the present invention are characterized by the following structures. That is, on the basis of an substituent having the unsaturated double bond, the polyorganosiloxane represented by the general formula (I) regarding the first feature of this invention has one siloxane chain, the compound represented by the general formula (III) regarding the third feature of this invention has two siloxane chains, and the compound represented by the general formula (V) regarding the fifth feature of this invention has three siloxane chains. Moreover, on the basis of the fluorine atom-containing substituent, the polyorganosiloxane represented by the general formula (I) regarding the first feature of this invention has one siloxane chain, the compound represented by the general formula (VI) regarding the seventh feature of this invention has two siloxane chains, and the compound represented by the general formula (VII) regarding the ninth feature of this invention has three siloxane chains. Therefore, the above-mentioned structure of the polyorganosiloxane can be optionally selected in compliance with the kind and desired functional properties of the synthetic resin.

In the polyorganosiloxane having the plural siloxane chains represented by the above-mentioned general formula (III), (V), (VI) or (VII) of the third, fifth, seventh or ninth feature of this invention, the respective siloxane chains preferably have the same chain length in most of the cases where the polyorganosiloxane is used as a graft polymer to modify the synthetic resin. However, the polyorganosiloxane can have different molecular chain lengths in accordance with particular purpose.

The substituents represented by $R^5$ and $R^6$ in the general formula (III) and the substituents represented by $R^7$, $R^8$ and $R^9$ in the general formula (V) may be different from each other, and the substituents represented by $R^{16}$ and $R^{17}$ in the general formula (VI) and the substituents represented by $R^{24}$, $R^{25}$ and $R^{26}$ in the general formula (VII) may be also different from each other. However, except for the case where it is necessary to provide the synthetic resin with a specific function and except for the case where it is necessary to finely control the characteristics, the compound preferably has the same siloxane chain length and the same substituents, because if they are not the same, manufacturing steps increase and the tolerance of synthetic conditions is restricted.

The compound of the present invention represented by the general formula (I) of the first feature, the general formula (III) of the third feature, the general formula (V) of the fifth feature, the general formula (VI) of the seventh feature or the general formula (VII) of the ninth feature of this invention can be used as the raw material of a modifier for a silicone rubber which can be obtained by reacting the unsaturated double bond-containing substituent present in the molecule of the compound with another polyorganosiloxane containing a hydrosilyl group in the presence of a catalyst such as chloroplatinic acid, and can be also used as a polyorganosiloxane useful for the property modification of the synthetic resin, which mainly comprises an addition polymer capable of reacting with the unsaturated double bond-containing group present in the compound molecule of the present invention.

Now, reference will be made to the process for preparing the compounds of the present invention represented by the general formula (I) of the first feature, the general formula (III) of the third feature and the general formula (V) of the fifth feature of the present invention. In the first place, (tridecafluoro-1,1,2,2-tetrahydrooctyl)dimethylsilanol (IX) and hexamethylcyclotrisiloxane (X) are subjected to polymerization in the presence of a butyl lithium catalyst in an amount of 0.0005 to 1 mole, preferably 0.0005 to 0.5, more preferably 0.0005 to 0.1 mole of the above-mentioned silanol (IX) (initiator) in order to produce an intermediate (formula XI), and afterward dimethylchlorosilane having the unsaturated double bond-containing substituent is added thereto as a chain terminator, thereby obtaining a polyorganosiloxane having a desired average polymerization degree and represented by the undermentioned formula (XII).

Furthermore, when triethylamine is used in the above-mentioned reaction with the chlorosilane, this reaction can proceed more inevitably.

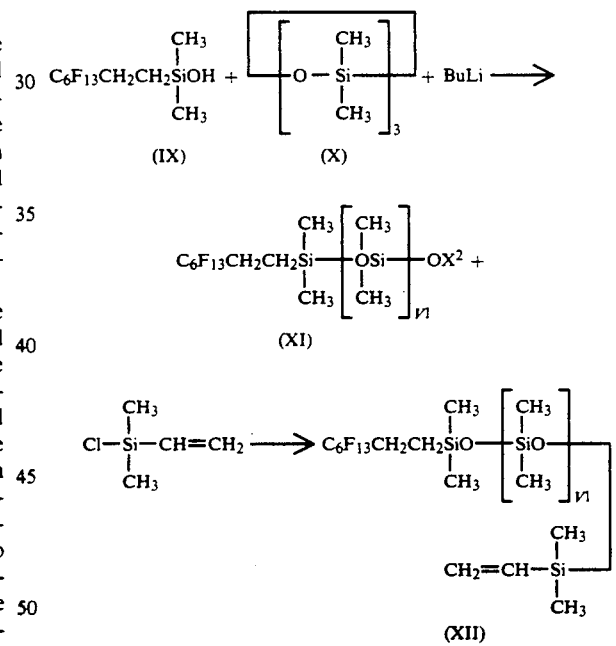

wherein Bu is a butyl group, $V^1$ is an integer of 1 to 1,999, and $X^2$ is a hydrogen atom or lithium atom.

For the intermediate represented by the formula (XI) in the preparation process, methyldichlorosilane having the unsaturated double bond-containing substituent can be used in place of dimethylchlorosilane having the unsaturated double bond-containing substituent as the chain terminator, so that a polyorganosiloxane represented by the formula (XIII) is obtained which has two siloxane chains on the basis of the silyl group, the siloxane chains being combined with the unsaturated double bond-containing substituent.

Furthermore, when triethylamine is used in the above-mentioned reaction with the chlorosilane, this reaction can proceed more inevitably.

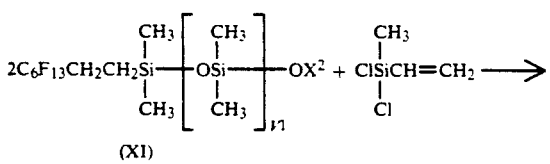

(XI)

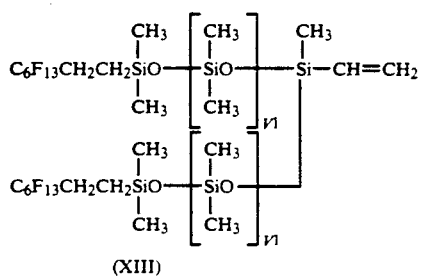

(XIII)

wherein $V^1$ is an integer of 1 to 1,999 and $X^2$ is a hydrogen atom or lithium atom.

Similarly, for the intermediate represented by the formula (XI), trichlorosilane having the unsaturated double bond-containing substituent can be used as the chain terminator, so that a polyorganosiloxane represented by the formula (XIV) is easily obtained which has three siloxane chains on the basis of the silyl group, the siloxane chains being combined with the unsaturated double bond-containing substituent.

Furthermore, when a triethylamine is used in the above-mentioned reaction with the chlorosilane, this reaction can proceed more inevitably.

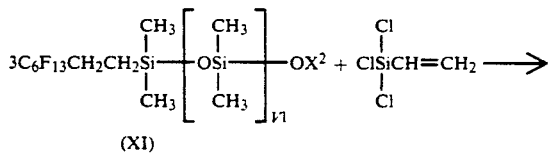

(XI)

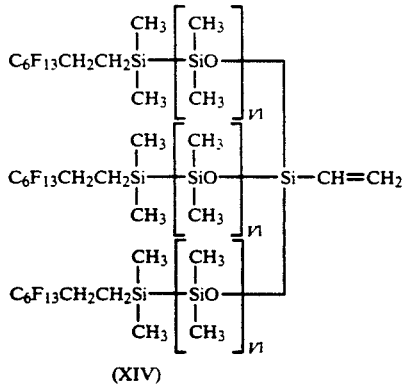

(XIV)

wherein $V^1$ is an integer of 1 to 1,999 and $X^2$ is a hydrogen atom or lithium atom.

Furthermore, (tridecafluoro-1,1,2,2-tetrahydrooctyl)dimethylsilanol (X) which is the trialkylsilanol of the polymerization initiator can be prepared by hydrolyzing (tridecafluoro-1,1,2,2-tetrahydrooctyl)dimethylchlorosilane. Examples of the trialkylchlorosilane compound include (tridecafluoro-1,1,2,2-tetrahydrooctyl)-dimethylchlorosilane, trimethylchlorosilane, ethyldimethylchlorosilane, n-butyldimethylchlorosilane, t-butyldimethylchlorosilane, isopropyldimethylchlorosilane, n-propyldimethylchlorosilane, pentafluorophenyldimethylchlorosilane, 3,3,3-trifluoropropyldimethylchlorosilane, (heptadecafluoro-1,1,2.,2-tetrahydroecyl)-dimethylchlorosilane, 3-(heptafluoroisopropoxy)-propyldimethylchlorosilane and 1,1,2,2-tetrafluoroethyldimethylchlorosilane.

As examples of the monochlorosilane compound having the unsaturated double bond-containing substituent which is used as the chain terminator in preparing the polyorganosiloxane having one siloxane chain combined with the unsaturated double bond-containing substituent, there are mentioned vinyldimethylchlorosilane, allyldimethylchlorosilane, 5-hexenyldimethylchlorosilane, 7-octenyldimethylchlorosilane, 13-tetradecenyldimethylchlorosilane, 3-methacryloxypropyldimethylchlorosilane, vinylmethylphenylchlorosilane, allylmethylphenylchlorosilane, 5-hexenylmethylphenylchlorosilane, 7-octenylmethylphenylchlorosilane, 13-tetradecenylmethylphenylchlorosilane, 3-methacryloxypropylmethylphenylchlorosilane, (m-ethenylphenyl)dimethylchlorosilane, (o-ethenylphenyl)dimethylchlorosilane, (p-ethenylphenyl)dimethylchlorosilane, [(m-ethenylphenyl)methyl]dimethylchlorosilane, [(o-ethenylphenyl)methyl]dimethylchlorosilane, [(p-ethenylphenyl)methyl]dimethylchlorosilane, [β-(m-ethenylphenyl)ethyl]dimethylchlorosilane, [β-(o-ethenylphenyl)ethyl]dimethylchlorosilane, [β-(p-ethenylphenyl)ethyl]dimethylchlorosilane, vinyldiphenylchlorosilane, allyldiphenylchlorosilane, 5-hexenyldiphenylchlorosilane, 7-octhenyldiphenylchlorosilane, 13-tetradecenyldiphenylchlorosilane and 3-methacryloxypropyldiphenylchlorosilane.

Furthermore, as examples of the dichlorosilane compound having the unsaturated double bond-containing substituent which can be used as the chain terminator in preparing the polyorganosiloxane having two siloxane chains combined with the unsaturated double bond-containing substituent, there are mentioned vinylmethyldichlorosilane, allylmethyldichlorosilane, 5-hexenylmethyldichlorosilane, 7-octenylmethyldichlorosilane, 13-tetradecenylmethyldichlorosilane, 3-methacryloxypropylmethyldichlorosilane, vinylphenyldichlorosilane, (m-ethenylphenyl)methyldichlorosilane, (o-ethenylphenyl)methyldichlorosilane, (p-ethenylphenyl)methyldichlorosilane, [(m-ethenylphenyl)methyl]methyldichlorosilane, [(o-ethenylphenyl)methyl]-methyldichlorosilane, [(p-ethenylphenyl)methyl]methyldichlorosilane, [β-(m-ethenylphenyl)ethyl]methyldichlorosilane, [β-(o-ethenylphenyl)ethyl]methyldichlorosilane, [8-(p-ethenylphenyl)ethyl]methyldichlorosilane, allylphenyldichlorosilane, 5-hexenylphenyldichlorosilane, 7-octhenylphenyldichlorosilane, 13-tetradecenylphenyldichlorosilane and 3-methacryloxypropylphenyldichlorosilane.

As examples of the trichlorosilane compound having the unsaturated double bond-containing substituent which can be used as the chain terminator in preparing the polyorganosiloxane having three siloxane chains combined with the unsaturated double bond-containing substituent, there are mentioned vinyltrichlorosilane, allyltrichlorosilane, 5-hexenyltrichlorosilane, 7-octenyltrichlorosilane, 13-tetradecenyltrichlorosilane, (m-ethenylphenyl)trichlorosilane, (o-ethenylphenyl)trichlorosilane, (p-ethenylphenyl)trichlorosilane, [(m-ethenylphenyl)methyl]trichlorosilane, [(o-ethenylphenyl)methyl]trichlorosilane, [(p-ethenylphenyl)methyl]trichlorosilane, [β-(m-ethenylphenyl)ethyl]trichlorosilane, [β-(o-ethenylphenyl)ethyl]trichlorosilane, [β-(p-ethenylphenyl)ethyl]trichlorosilane and 3-methacryloxypropyltrichlorosilane.

Now, reference will be made to one example of the preparation of the polyorganosiloxane represented by the general formula (I) of the first feature, the general formula (VI) of the seventh feature, and the general formula (VII) of the ninth feature of the present invention. In the first place, the vinyldimethylsilanol (XI) is polymerized with hexamethylcyclotrisiloxane (X) in the presence of a butyl lithium catalyst in an amount of 0.0005 to 1 mole, preferably 0.0005 to 0.5 mole, more preferably 0.0005 to 0.1 mole per mole of the above-mentioned silanol (IX) (initiator), and (tridecafluoro-1,1,2,2-tetrahydrooctyl)dimethylchlorosilane is then added thereto as a chain terminator, thereby obtaining a polyorganosiloxane having a desired average polymerization degree and represented by the undermentioned formula (XVII).

Furthermore, when a triethylamine is used in the above-mentioned reaction with the chlorosilane, this reaction can proceed more inevitably.

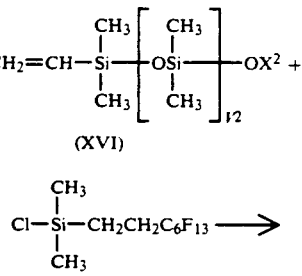

(XV)  (X)

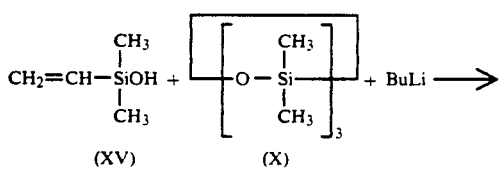

(XVII)

wherein Bu is a butyl group, $V^2$ is an integer of 1 to 1,999, and $X^2$ is a hydrogen atom or lithium atom.

For the intermediate represented by the formula (XVI), methyldichlorosilane having the fluorine atom-containing substituent can be substituted for dimethylchlorosilane having the fluorine atom-containing substituent as the chain terminator, so that a polyorganosiloxane represented by the undermentioned formula (XVIII) is obtained which has two siloxane chains on the basis of the silyl group, the siloxane chains being combined with the fluorine atom-containing substituent.

Furthermore, when a triethylamine is used in the above-mentioned reaction with the chlorosilane, this reaction can proceed more inevitably.

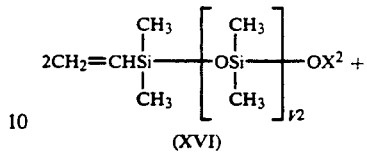

(XVI)

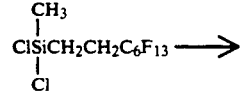

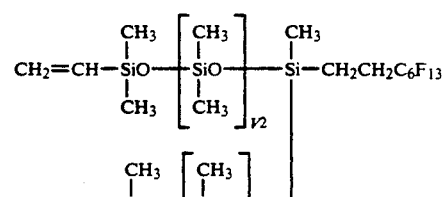

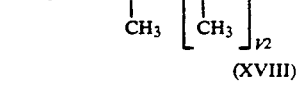

(XVIII)

wherein $V^2$ is an integer of 1 to 1,999 and $X^2$ is a hydrogen atom or lithium atom.

Similarly, for the intermediate represented by the formula (XVI), trichlorosilane having the fluorine atom-containing substituent can be used as the chain terminator, so that a polyorganosiloxane represented by the undermentioned formula (XIX) is obtained which has three siloxane chains on the basis of the silyl group, the siloxane chains being combined with the fluorine atom-containing substituent.

Furthermore, when a triethylamine is used in the above-mentioned reaction with the chlorosilane, this reaction can proceed more inevitably.

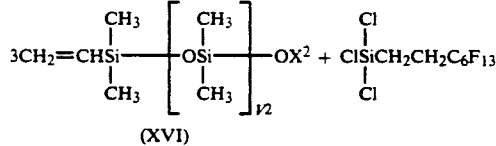

(XVI)

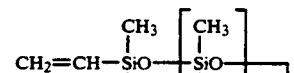

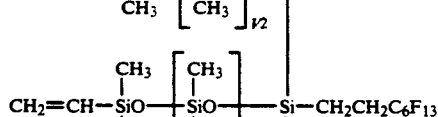

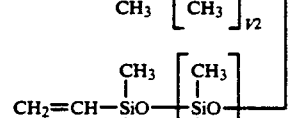

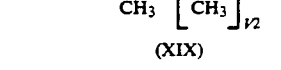

(XIX)

wherein $V^2$ is an integer of 1 to 1,999 and $X^2$ is a hydrogen atom or lithium atom.

Furthermore, vinyldimethylsilanol (XV) which is the alkenyldialkylsilanol of the polymerization initiator can be prepared by hydrolyzing vinyldimethylchlorosilane. Examples of the alkenyldialkylchlorosilane compound include vinyldimethylchlorosilane, allyldimethylchlorosilane, 5-hexenyldimethylchlorosilane, 7-octenyldimethylchlorosilane, 13-tetradecenyldimethylchlorosilane, vinylmethylphenylchlorosilane, allylmethylphenylchlorosilane, 5-hexenylmethylphenylchlorosilane, 7-octenylmethylphenylchlorosilane, 13-tetradecenylmethylphenylchlorosilane, (m-ethenylphenyl)dimethylchlorosilane, (o-ethenylphenyl)dimethylchlorosilane, (p-ethenylphenyl)dimethylchlorosilane, [(m-ethenylphenyl)methyl]dimethylchlorosilane, [(o-ethenylphenyl)methyl]dimethylchlorosilane, [(p-ethenylphenyl)methyl]dimethylchlorosilane, [β-(m-ethenylphenyl)ethyl]dimethylchlorosilane, [β-(o-ethenylphenyl)ethyl]dimethylchlorosilane, [β-(p-ethenylphenyl)ethyl]dimethylchlorosilane, vinyldiphenylchlorosilane, allyldiphenylchlorosilane, 5-hexenyldiphenylchlorosilane, 7-octhenyldiphenylchlorosilane, 13-tetradecenyldiphenylchlorosilane and 3-methacryloxypropyldimethylchlorosilane.

As examples of the monochlorosilane compound having the fluorine atom-containing substituent which is used as the chain terminator in preparing the polyorganosiloxane having one siloxane chain combined with the fluorine atom-containing substituent, there are mentioned (tridecafluoro-1,1,2,2-tetrahydrooctyl)dimethylchlorosilane, pentafluorophenyldimethylchlorosilane, 3,3,3-trifluoropropyldimethylchlorosilane, (heptadecafluoro-1,1,2,2-tetrahydrodecyl)dimethylchlorosilane, 3-(heptafluoroisopropoxy)propyldimethylchlorosilane and 1,1,2,2-tetrafluoroethyldimethylchlorosilane.

As examples of the dichlorosilane compound having the fluorine atom-containing substituent which is used as the chain terminator in preparing the polyorganosiloxane having two siloxane chains combined with the fluorine atom-containing substituent, there are mentioned (tridecafluoro-1,1,2,2-tetrahydrooctyl)dimethyldichlorosilane, pentafluorophenylmethyldichlorosilane, 3,3,3-trifluoropropylmethyldichlorosilane, (heptadecafluoro-1,1,2,2-tetrahydrodecyl)methyldichlorosilane, 3-(heptafluoroisopropoxy)propylmethyldichlorosilane and 1,1,2,2-tetrafluoroethylmethyldichlorosilane.

As examples of the trichlorosilane compound having the fluorine atom-containing substituent which is used as the chain terminator in preparing the polyorganosiloxane having three siloxane chains combined with the fluorine atom-containing substituent, there are mentioned (tridecafluoro-1,1,2,2-tetrahydrooctyl)trichlorosilane, pentafluorophenyltrichlorosilane, 3,3,3-trifluoropropyltrichlorosilane, (heptadecafluoro-1,1,2,2-tetrahydrodecyl)trichlorosilane, 3-(heptafluoroisopropoxy)propyltrichlorosilane and 1,1,2,2-tetrafluoroethyltrichlorosilane.

The molecular weight of the polysiloxane can be easily controlled by adjusting amounts of the alkenyldialkylsilanol which is the initiator and hexamethylcyclotrisiloxane, in the case that the number of the dimethylsiloxane units is 2000 or less (number average molecular weight=about 150000 or less). In addition, even when the number average molecular weight is greater, the control of the molecular weight can be accomplished by changing conditions for living polymerization.

In this manner, the novel polyorganosiloxane can be prepared which has the fluorine atom-containing substituent at an $\alpha$-($\alpha'$- or $\alpha''$-)position and has the unsaturated double bond-containing substituent at a $\omega$-($\omega'$- or $\omega''$-)position.

When the polyorganosiloxane having the fluorine atom-containing substituent at an $\alpha$-($\alpha'$- or $\alpha''$-) position and the unsaturated double bond-containing substituent at a $\omega$-($\omega'$- or $\omega''$-)position is used to improve the characteristics of silicone rubbers, the density of the fluoroalkyl group can be more heightened in the surface portions of these products than in the interiors thereof, because the fluoroalkyl group is present at the molecular chain terminal which is most distant from the reactive group capable of chemically bonding to the silicone rubber, and the degree of freedom of the fluoroalkyl group is higher than in the case in which the fluoroalkyl group is present on the pendant site. To sum up, the compound of the present invention can obtain the great improvement effect of the surface characteristics under a influence of the small amount of the fluoroalkyl group in contrast to the conventional compound in which the fluoroalkyl group exists only in the pendant portion, and the molecular chain length of the compound according to the present invention can be altered so as to control the characteristics.

Moreover, the polyorganosiloxane having the fluoroalkyl group with more fluorine atoms can be synthesized more easily than the compound having the group in the pendant site, and when the fluoroalkyl groups are introduced into both the pendant portion and the molecular chain end, the silicone rubber can possess improved oil resistance and solvent resistance.

Since the polyorganosiloxane of the present invention is able to have a very narrow molecular weight distribution (dispersity) of 1.1 to 1.2, i.e., a uniform molecular chain length, by using the lithium catalyst in an amount of 0.0005 to 0.5, preferably 0.0005 to 0.1 mole per mole of the silanol initiator, when the compound is introduced into a silicone rubber, the latter can take a more uniform structure than when a compound having a nonuniform molecular chain length is used. In addition, the synthetic process of the present invention by the utilization of the living polymerization does not form any cyclic compounds of dimethylsiloxane which cannot be removed by any means, whereas the equilibrating reaction using an acidic or basic catalyst cannot avoid the production of the cyclic compounds. Accordingly, the deterioration in physical properties and bleeding of the products and the scatter of product quality, which are attributable to these cyclic compounds, can be inhibited, so that the physical properties and the like can be improved.

When in place of a conventional terminal-modified polyorganosiloxane not having any reactive group and fluoroalkyl group in one molecule, the compound having the fluorine atom-containing substituent at an $\alpha$-($\alpha'$- or $\alpha''$-)position and the unsaturated double bond-containing substituent at a $\omega$-($\omega'$- or $\omega''$-)position of the present invention is introduced into a synthetic resin mainly comprising a polymer such as polymethyl (meth)acrylate, polyvinyl chloride or polyolefin, for example, polyethylene or polypropylene which can be obtained by the polymerization of the unsaturated double bond so as to improve the specific characteristics of the synthetic resin, the following effects can be obtained.

(1) Since the reactive group in the polyorganosiloxane of the present invention is chemically bonded to the synthetic resin, the deterioration in its characteristics with time can be inhibited.

(2) Since the fluoroalkyl group is present in one molecule, it is possible to provide the synthetic resin with various excellent specific functions of the fluorine atom-containing substituent, such as water repellency, stain resistance, release properties, non-adhesive properties, oil-repellent properties, low frictional properties and snow deposition resistance, which cannot be obtained from or is superior to the conventional polysiloxane terminated with trimethyl siloxy group, without impairing the characteristics of the polyorganosiloxane.

(3) It is possible to obtain a very narrow molecular weight distribution (dispersity) of 1.1 to 1.2, and therefore, when the polyorganosiloxane of the present invention having a uniform molecular chain length is introduced into the synthetic resin, the latter can take a more uniform structure than when a compound having a nonuniform molecular chain length is used. In addition, the synthetic process of the present invention by the utilization of living polymerization does not form any cyclic compounds of dimethylsiloxane which cannot be removed by any means, though a conventional equilibrating reaction by the use of an acidic or basic catalyst cannot avoid the production of the cyclic compound. Accordingly, the deterioration in physical properties and bleeding of the products and the scatter of products quality, which are attributable to these cyclic compounds, can be inhibited, so that the physical properties and the like can be improved.

(4) Also when the polyorganosiloxane of the present invention is used as a graft polymer so as to improve characteristics of the synthetic resin such as water repellency, stain resistance, release properties, non-adhesive properties, oil-repellent properties and low frictional properties, the synthetic resin can be provided with not only the function of the siloxane but also the specific function of the fluoroalkyl group. Furthermore, since the compound of the present invention is able to have the uniform molecular chain length, the uniform structure can be obtained, and in addition the molecular chain lengths of the siloxane portion and the fluoroalkyl group portion can be changed so as to regulate the characteristics. In consequence, the compound of the present invention can be applied to uses in which high performance is required, and in particular, it can be applied to the surface modification of the synthetic resin, to which uses the conventional dimethylsiloxane having no fluoroalkyl group cannot be applied.

(5) In the polyorganosiloxane of the present invention, three conditions can be optionally obtained which are the number of the 1 to 3 siloxane chains on the basis of the unsaturated double bond-containing substituent which is the group reactive with the synthetic resin, the number of the 1 to 3 siloxane chains on the basis of the fluorine atom-containing substituent, the length of the siloxane chain controlled in compliance with a purpose and the kind of fluorine atom-containing substituent at the terminal of the siloxane chain. Therefore, finely controlled characteristics can be given to the intended synthetic resin or silicone rubber in accordance with required functions.

EXAMPLES

Now, the present invention will be described in detail in reference to examples, but the scope of the present invention should not be limited to these examples.

EXAMPLE 1

Preparation of 1-(tridecafluoro-1,1,2,2-tetrahydrooctyl)-9-vinyldecamethylpentasiloxane:

To a 1-liter three-necked round bottom flask equipped with a stirrer and a cooling device were fed 100 ml of previously dried tetrahydrofuran, 100.0 g (0.238 mole) of (tridecafluoro-1,1,2,2-tetrahydrooctyl)-dimethylsilanol and 52.9 g (0.238 mole) of hexamethylcyclotrisiloxane under $N_2$ gas, and 0.79 ml (1.5 mole/l) of a butyl lithium hexane solution was then added thereto and polymerization was performed at 20° C. for 10 hours.

Next, 31.5 g (0.261 mole) of dimethylchlorosilane and 40.0 g (0.40 mole) of triethylamine was further added thereto, followed by stirring for 1 hour in order to bring the polymerization to an end. The thus synthesized material was then transferred into a separating funnel, then washed with water to remove the resulting lithium chloride therefrom, and dried with anhydrous sodium sulfate.

Afterward, low-boiling substances in the resulting reaction product were distilled off under conditions of 100° C. and 100 mmHg over 2 hours, thereby obtaining a desired polydimethylsiloxane in a substantially quantitative yield. With regard to the thus obtained polydimethylsiloxane, analytical results of $^1$H-NMR spectrum (nuclear magnetic resonance spectrum), IR spectrum (infrared absorption spectrum), GPC (gel permeation chromatography) and viscosity were as follows, and it was confirmed that the obtained polydimethylsiloxane had the following structure:

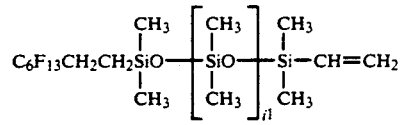

$^1$H-NMR(CDCl$_3$): δppm
0.18 (Si(CH$_3$)$_2$, s, 30H)
0.53–2.80 (SiCH$_2$CH$_2$, broad, 4H)
5.60–5.90 (Si—CH=CH$_2$, m, 3H)
IR (KBr):
2970 cm$^{-1}$ (C-H)
1610 cm$^{-1}$ (Si—CH=CH$_2$)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 1.

Molecular weight determined by the GPC technique with polystyrene standards (toluene):
Number average molecular weight (Mn)—720
Weight average molecular weight (Mw)—865
Dispersity (Mw/Mn)—1.2
(molecular weight on calculated values was 728)
Viscosity (250° C.)—9.0 centipoise The repeating unit i$^1$ can be obtained by the following formula on the basis of the data regarding the number average molecular weight of GPC:

$i^1 =$ (number average molecular weight—molecular weight of moiety A—molecular weight of moiety C)/ [molecular weight of one moiety B (= 74.2)]

wherein the moieties A, B and C are as follows:

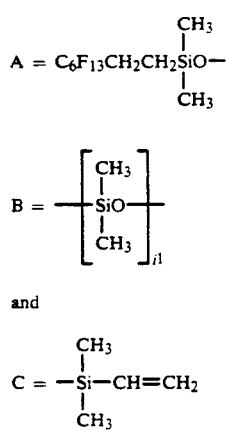

$$A = C_6F_{13}CH_2CH_2\underset{\underset{CH_3}{|}}{\overset{\overset{CH_3}{|}}{Si}}O-$$

$$B = -\left[\underset{\underset{CH_3}{|}}{\overset{\overset{CH_3}{|}}{Si}}O\right]_{i1}-$$

and $$C = -\underset{\underset{CH_3}{|}}{\overset{\overset{CH_3}{|}}{Si}}-CH=CH_2$$

The number average molecular weight was 720, and therefore as a result of the calculation of this formula, $i^1 = 3$.

This can be applied to the subsequent $i^2$ to $i^{17}$ in later examples.

However, it should be noted that the siloxane compounds are polymers having certain dispersions, and the thus obtained values of i's are only average values. Furthermore, since the data of the GPC number average molecular weights are approximate values, the calculated values of i's are also approximate values.

EXAMPLE 2

Preparation of a polydimethylsiloxane having a heptadecafluoro-1,1,2,2-tetrahydrodecyl group at the α-position and a vinyl group at the ω-position:

To a 2-liter three-necked round bottom flask equipped with a stirrer and a cooling device were fed 250 ml of previously dried tetrahydrofuran, 12.4 g (0.0237 mole) of (heptadecafluoro-1,1,2,2-tetrahydrodecyl)dimethylsilanol and 244.0 g (1.10 moles) of hexamethylcyclotrisiloxane under N₂ gas, and 0.16 ml (1.5 moles/l) of a butyl lithium hexane solution was then added thereto and polymerization was performed at 20° C. for 20 hours. Next, 3.0 g (0.0249 mole) of vinyldimethylchlorosilane and 4.0 g (0.040 mole) of triethylamine was further added thereto, followed by stirring for 1 hour in order to bring the polymerization to an end. The thus synthesized material was then transferred into a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm⁻¹ (C—H)
1260 cm⁻¹ (Si—CH₃)
1250–1150 cm⁻¹ (CF₂, CF₃)
1120–1050 cm⁻¹ (Si—O)

Figure 2:
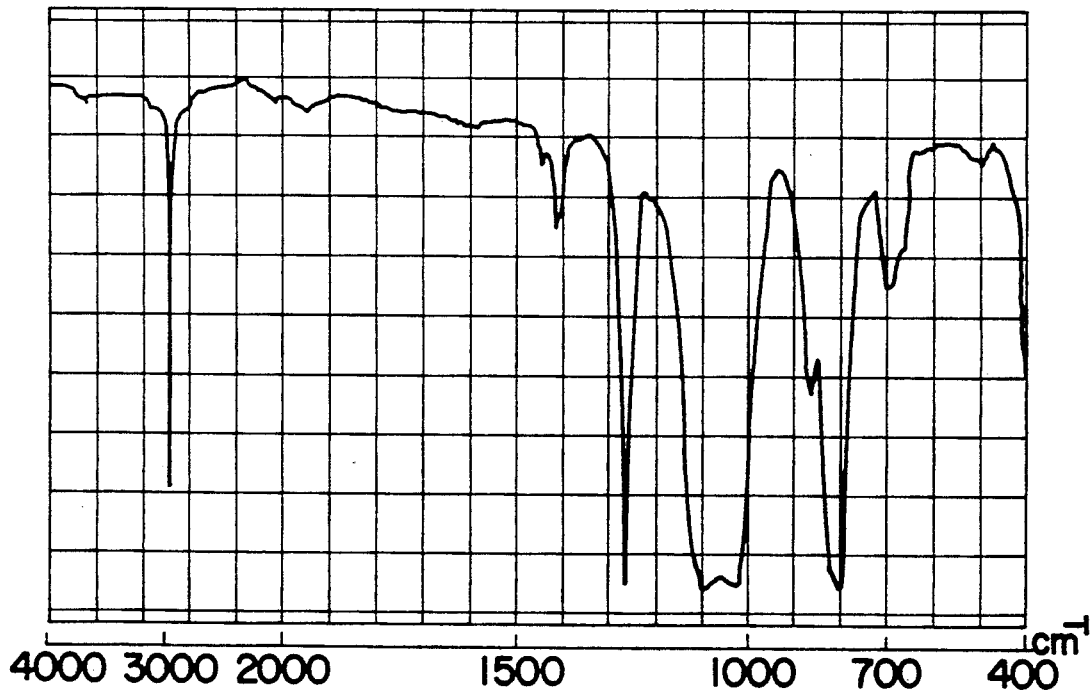

An IR chart is shown in FIG. 2.

Molecular weight determined by the GPC technique with polystyrene standards (toluene):
Number average molecular weight (Mn)—12130
Weight average molecular weight (Mw)—13530
Dispersity (Mw/Mn)—1.1
Viscosity (25° C.)—199 centipoise

EXAMPLE 3

Preparation of a polydimethylsiloxane having a pentafluorophenyl group at the α-position and a vinyl group at the ω-position:

To a 500-milliliter three-necked round bottom flask equipped with a stirrer and a cooling device were fed 50 ml of previously dried tetrahydrofuran, 0.24 g (0.00099 mole) of (pentafluorophenyl)dimethylsilanol and 49.2 g (0.221 mole) of hexamethylcyclotrisiloxane under N₂ gas, and 0.66 ml (1.5 moles/l) of a butyl lithium hexane solution was then added thereto and polymerization was performed at 20° C for 24 hours.

Next, 0.13 g (0.00108 mole) of vinyldimethylchlorosilane and 0.20 g (0.0020 mole) of triethylamine was further added thereto, followed by stirring for 1 hour in order to bring the polymerization to an end. The thus synthesized material was then transferred into a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm⁻¹ (C-CH)
1260 cm⁻¹ (Si—CH₃)
1250–1150 cm⁻¹ (CF₂, CF₃)
1120–1050 cm⁻¹ (Si—O)

Figure 3:
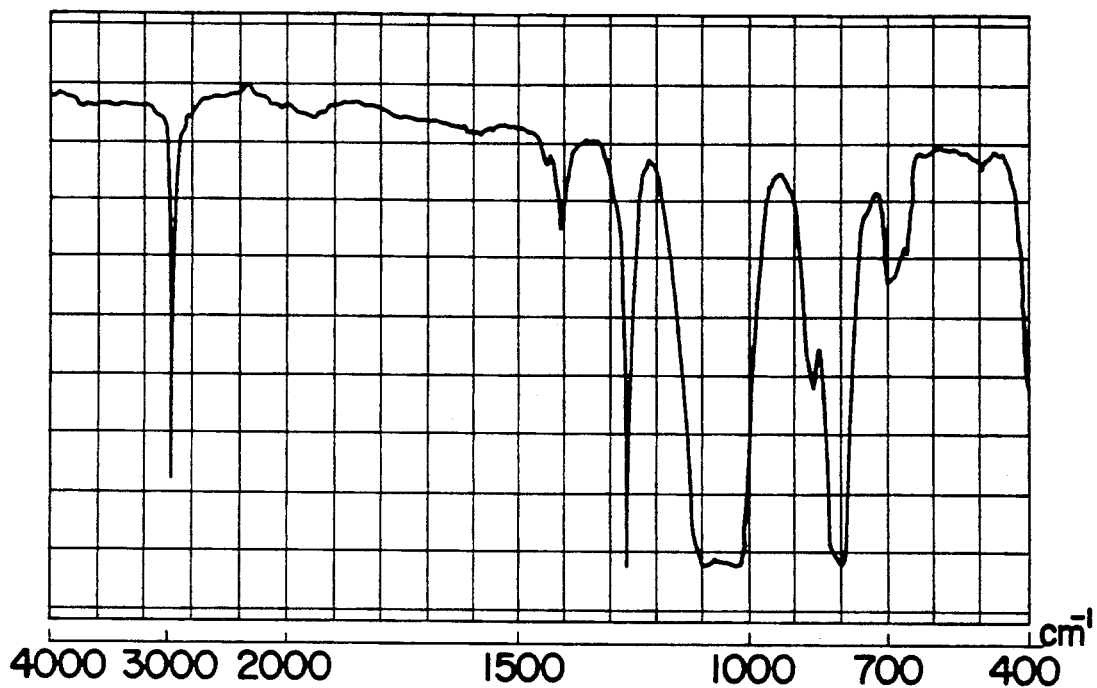

An IR chart is shown in FIG. 3.

Molecular weight determined by the GPC technique with polystyrene standards (toluene):
Number average molecular weight (Mn)—1 43400
Weight average molecular weight (Mw)—52200
Dispersity (Mw/Mn)—1.2
Viscosity (25° C.)—3680 centipoise

REFERENCE EXAMPLE 1

Preparation of a polydimethylsiloxane having a tridecafluoro-1,1,2,2-tetrahydrooctyl group at the α-position and a silanol group at the ω-position:

To a 5-liter three-necked round bottom flask equipped with a stirrer and a cooling device were fed 1000 ml of previously dried tetrahydrofuran, 168.4 g (0.40 mole) of (tridecafluoro-1,1,2,2-tetrahydrooctyl)dimethylsilanol and 1032 g (4.64 moles) of hexamethylcyclotrisiloxane under N₂ gas, and 31.0 ml (1.5 moles/l) of a butyl lithium hexane solution was then added thereto and polymerization was performed at 20° C. for 15 hours.

Next, 2.8 g (0.0464 mole of acetic acid was further added thereto, followed by stirring for 1 hour in order to bring the polymerization to an end. The thus synthesized material was then transferred to a separating funnel, then washed with water, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

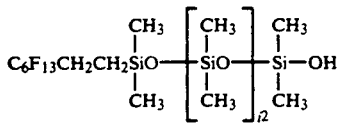

Figure 4:
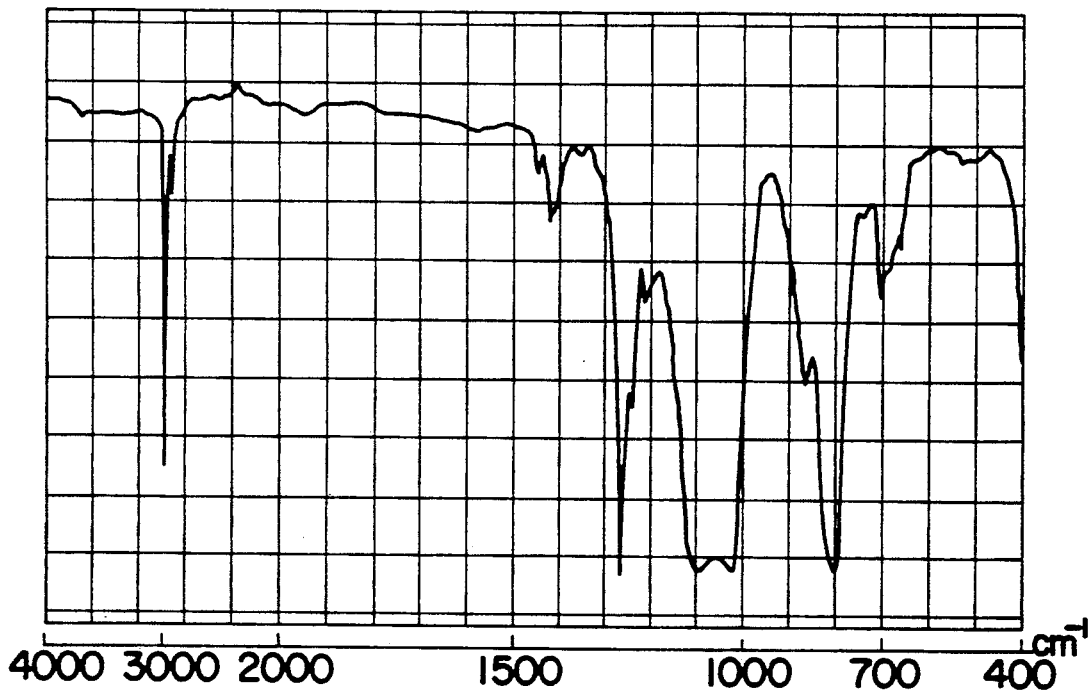
FIG. 4 is an IR chart of a siloxane compound prepared in Reference Example 1.

IR (KBr):
3400–3200 cm$^{-1}$ (Si—OH)
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 4.
Molecular weight determined by the GPC technique with polystyrene standards (toluene):
Number average molecular weight (Mn)—3060
Weight average molecular weight (Mw)—3800
Dispersity (Mw/Mn)—1.2
Quantitative data of Si—OH group: OH (wt %)—0.55 (wt. %)
Molecular weight calculated on OH (wt %)—3090
Viscosity (25° C.)—42 centipoise The repeating units $i^2$ to $i^8$ can be calculated in the same manner as in Example 1, but when analytical data of the terminal group (Si—OH) of the compound obtained in Reference Example 1 are utilized, more accurate values can be procured. That is, $i^2 = $(molecular weight calculated from the quantitative data for OH group $-$ molecular weight of moiety $G -$ molecular weight of moiety $K$)/[molecular weight of one moiety $H$ ($=74.2$)]

wherein the moieties G, K and H are as follows:

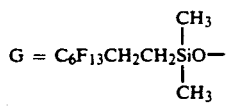

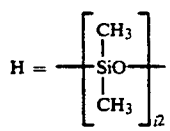

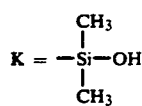

As a result of the calculation in accordance with the above formula in which the molecular weight calculated from the quantitative data for the OH group was 3090, $i^2 = 35$.

Each value of the repeating units $i^3$ to $i^8$ was $i^2 + 1$, because compounds having the repeating units $i^3$ to $i^8$ were synthesized by using the compound in Reference Example 1 as the raw material.

EXAMPLE 4

Preparation of a polydimethylsiloxane having a tridecafluoro-1,1,2,2-tetrahydrooctyl group at the ζ-position and a vinyl group at the ω-position:

To a 1-liter three-necked round bottom flask equipped with a stirrer and a cooling device were fed 100 ml of previously dried tetrahydrofuran, 127.0 g of a polydimethylsiloxane having a tridecafluoro-1,1,2,2-tetrahydrooctyl group at an α-position and a dimethylsilanol group at a ω-position obtained in Reference Example 1, 7.0 g (0.0692 mole) of triethylamine, and 5.46 ml (0.0452 mole) of vinyldimethylchlorosilane was then added dropwise thereto at room temperature. After completion of the addition, the solution was further stirred for 1 hour to perform reaction. The thus synthesized material was then transferred to a separating funnel, then washed with water to remove the resulting salt therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained siloxane compound, analytical results of IR spectrum, GPC (gel permeation chromatography) and viscosity were as follows, and it was confirmed that the obtained polydimethylsiloxane had the following structure:

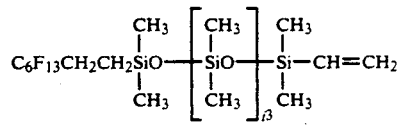

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 5.
Molecular weight determined by the GPC technique with polystylene standards (toluene):
Number average molecular weight (Mn)—3110
Weight average molecular weight (Mw)—3800
Dispersity (Mw/Mn)—1.2
Viscosity (25° C.)—35 centipoise
As a result of calculation in accordance with eh previously mentioned formula, $i^3 = 36$.

EXAMPLE 5

Preparation of a polydimethylsiloxane having a tridecafluoro-1,1,2,2-tetrahydrooctyl group at the α,α″-positions and a vinyl group at the ω-position:

To a 1-liter three-necked round bottom flask equipped with a stirrer and a cooling device were fed 100 ml of previously dried tetrahydrofuran, 127.0 g of a polydimethylsiloxane having a tridecafluoro-1,1,2,2-tetrahydrooctyl group at an α-position and a dimethylsilanol group at a ω-position obtained in Reference Example 1 and 7.0 g (0.0692 mole) of triethylamine, and 3.17 g (0.0226 mole) of methylvinylchlorosilane was then added dropwise thereto at room temperature. After completion of the addition, the solution was further stirred for 1 hour to perform reaction. The thus synthesized material was then transferred to a separating funnel, then washed with water to remove the resulting salt therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

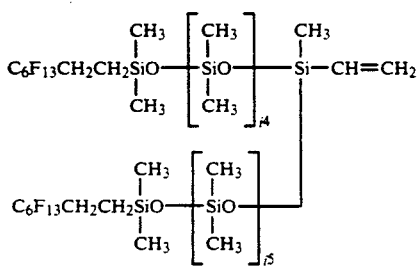

IR (KBr):
2970 cm$^{-1}$ (C—H)
1260 cm$^{-1}$ (Si—CH$_3$)
1250–1150 cm$^{-1}$ CF$_2$, CF$_3$)
1120–1050 cm$^{-1}$ (Si—O)
An IR chart is shown in FIG. 6.
Molecular weight determined by the GPC technique with polystyrene standards (toluene):
Number average molecular weight (Mn)—5790
Weight average molecular weight (Mw)—6830
Dispersity (Mw/Mn)—1.2
Viscosity (25° C.)—1 68 centipoise
As a result of calculation in accordance with the previously mentioned formula, $i^4 = i^5 = 36$.

EXAMPLE 6

Preparation of a polydimethylsiloxane having a tridecafluoro-1,1,2,2-tetrahydrooctyl group at the α,α',-α"-positions and a vinyl group at the ω-position:

To a 1-liter three-necked round bottom flask equipped with a stirrer, and a cooling device were fed 100 ml of previously dried tetrahydrofuran, 127.0 g of a polydimethylsiloxane having a tridecafluoro-1,1,2,2-tetrahydrooctyl group at an α-position and a dimethylsilanol group at a ω-position obtained in Reference Example 1 and 7.0 g (0.0692 mole) of triethylamine, and 2.42 g (0.0151 mole) of vinyltrichlorosilane was then added dropwise thereto at room temperature. After completion of the addition, the solution was further stirred for 1 hour to perform reaction,. The thus synthesized material was then transferred to a separating funnel, then washed with water to remove the resulting salt therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

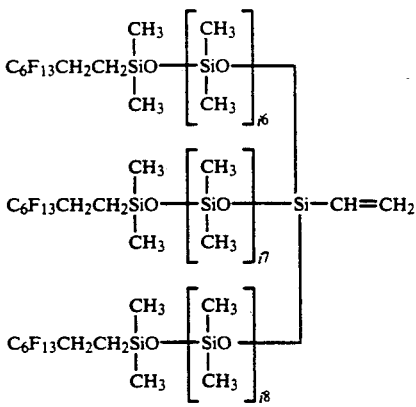

Figure 7:
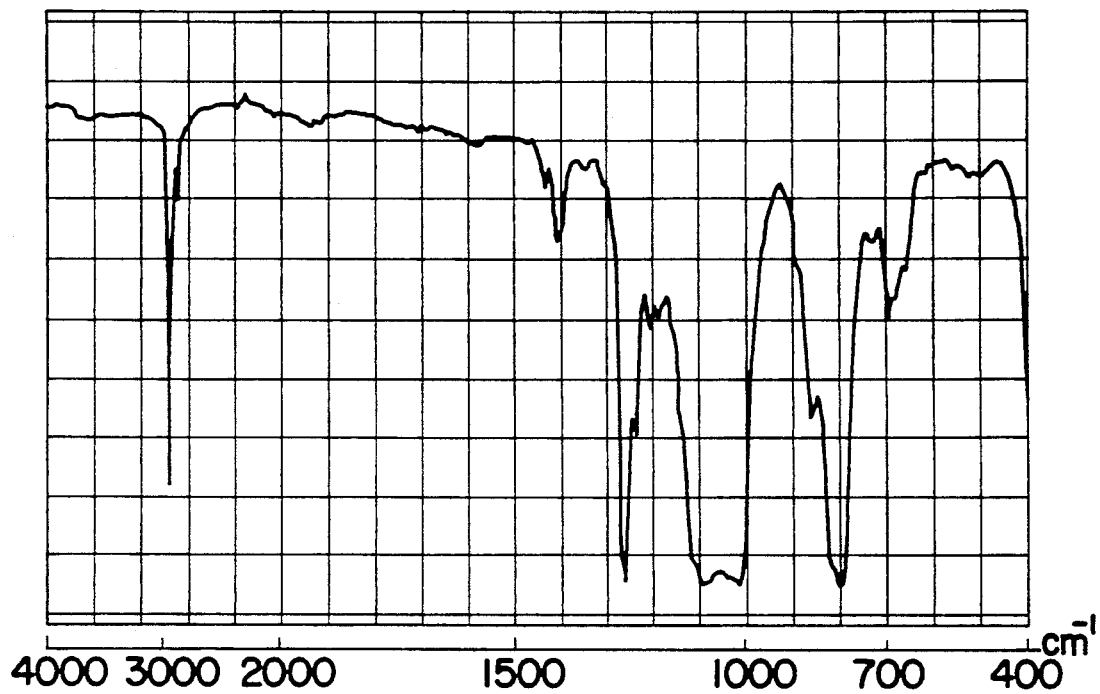

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 7.
Molecular weight determined by the GPC technique with polystyrene standards (toluene):
Number average molecular weight (Mn)—8010
Weight average molecular weight (Mw)—9590
Dispersity (Mw/Mn)—1.2
Viscosity (25° C.)—93 centipoise
As a result of calculation in accordance with the previously mentioned formula, $i^6 = i^7 = i^8 = 36$.

EXAMPLE 7

Preparation of a polydimethylsiloxane having a tridecafluoro-1,1,2,2-tetrahydrooctyl group at the α,α',-α"-positions and an allyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N$_2$ gas, and 0.27 ml (1.5 moles/l) of a butyl lithium hexane solution was then added thereto and polymerization was performed at 20° C. for 15 hours.

Next, 2.65 g (0.0151 mole) of allyltrichlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

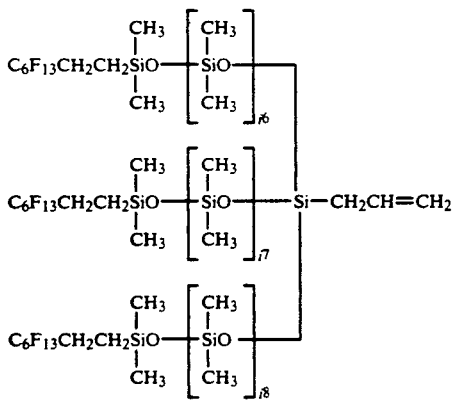

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)

Figure 8:
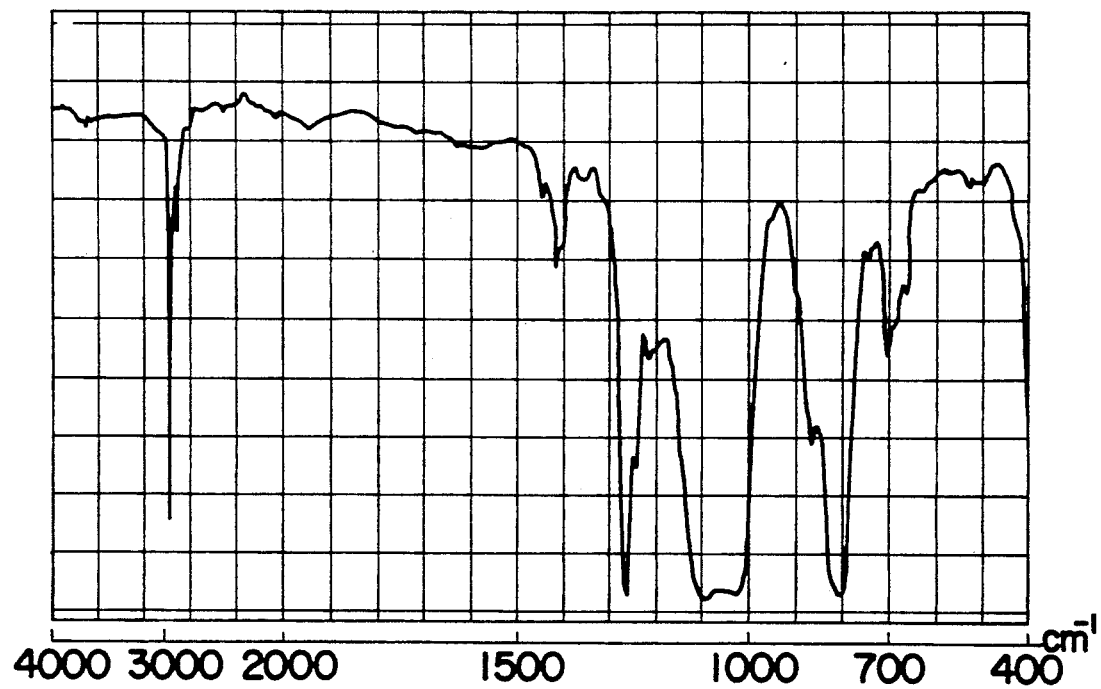

An IR chart is shown in FIG. 8.

Molecular weight determined by the GPC technique with polystyrene standards (toluene):
Number average molecular weight—(Mn) 7830
Weight average molecular weight (Mw)—9390
Dispersity (Mw/Mn)—1.2
Viscosity (25° C.)—91 centipoise

EXAMPLE 8

Preparation of a polydimethylsiloxane having a tridecafluoro-1,1,2,2-tetrahydrooctyl group at the α-position and a 5-hexenyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N$_2$ gas, and 0.27 ml (1.5 moles/l) of a butyl lithium hexane solution was then added thereto and polymerization was performed at 20° C. for 15 hours.

Next, 8.0 g (0.0452 mole) of 5-hexenyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate. Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)

Figure 9:
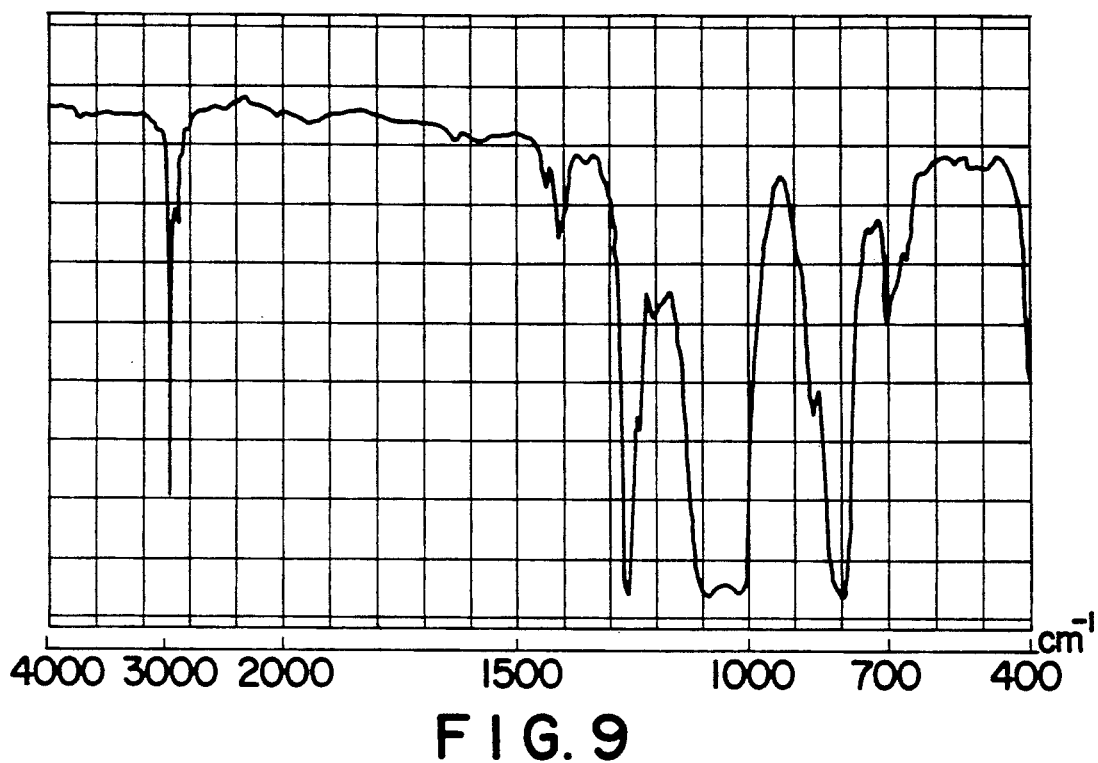

An IR chart is shown in FIG. 9.

Molecular weight determined by the GPC technique with polystyrene standards (toluene):
Number average molecular weight (Mn)—3290
Weight average molecular weight (Mw)—4000
Dispersity (Mw/Mn)—1.2
Viscosity (25° C.)—34 centipoise

EXAMPLE 9

Preparation of a polydimethylsiloxane having a tridecafluoro-1,1,2,2-tetrahydrooctyl group at the α,α′,α″-positions and a 5-hexenyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N$_2$ gas, and 0.27 ml (1.5 moles/l) of a butyl lithium hexane solution was then added thereto and polymerization was performed at 20° C. for 15 hours.

Next, 3.29 g (0.0151 mole) of 5-hexenyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)

Figure 10:
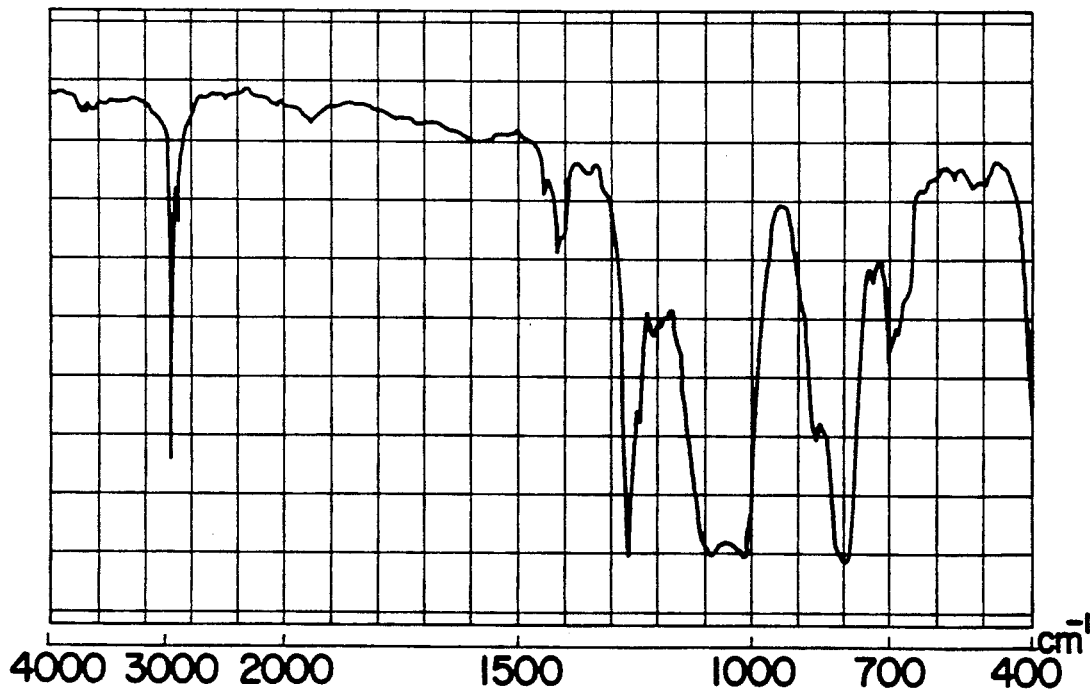

An IR chart is shown in FIG. 10.

Molecular weight determined by the GPC technique with polystyrene standards (toluene):
Number average molecular weight (Mn)—7820
Weight average molecular weight (Mw)—9490
Dispersity (Mw/Mn)—1.2
Viscosity (25° C.) 89 centipoise

EXAMPLE 10

Preparation of a polydimethylsiloxane having a tridecafluoro-1,1,2,2-tetrahydrooctyl group at the α-position and a 7-octenyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N2 gas, and 0.27 ml (1.5 moles/l) of a butyl lithium hexane solution was then added thereto and polymerization was performed at 20° C. for 15 hours.

Next, 9.25 g (0.0452 mole) of 7-octenyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 11.
Molecular weight determined by the GPC technique with polystyrene standards (toluene):
Number average molecular weight (Mn)—3300
Weight average molecular weight (Mw)—4000
Dispersity (Mw/Mn)—1.2
Viscosity (25° C.)—35 centipoise

EXAMPLE 11

Preparation of a polydimethylsiloxane having a tridecafluoro-1,1,2,2-tetrahydrooctyl group at the $\alpha,\alpha',\alpha''$-positions and a 7-octenyl group at the $\omega$-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N$_2$ gas, and 0.27 ml (1.5 moles/l) of a butyl lithium hexane solution was then added thereto and polymerization was performed at 20° C. for 15 hours.

Next, 3.71 g (0.0151 mole) of 7-octenylmethyltrichlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 12.
Molecular weight determined by the GPC technique with polystyrene standards (toluene):
Number average molecular weight (Mn)—7880
Weight average molecular weight (Mw)—9650
Dispersity (Mw/Mn)—1.2
Viscosity (25° C.)—89 centipoise

EXAMPLE 12

Preparation of a polydimethylsiloxane having a 3,3,3-trifluoropropyl group at the $\alpha$-position and a 13-tetradecenyl group at the $\omega$-position:

To a 100-milliliter three-necked round bottom flask equipped with a stirrer and a cooling device were fed 10 ml of previously dried tetrahydrofuran, 0.71 g (0.00411 mole) of (3,3,3-trifluoropropyl)dimethylsilanol and 10.60 g (0.0476 mole) of hexamethylcyclotrisiloxane under N$_2$ gas, and 2.7 ml (1.5 moles/l) of a butyl lithium hexane solution was then added thereto and polymerization was performed at 20° C. for 15 hours.

Next, 1.31 g (0.00452 mole) of 13-tetradecenyldimethylchlorosilane and 0.70 g (0.0069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Figure 13:
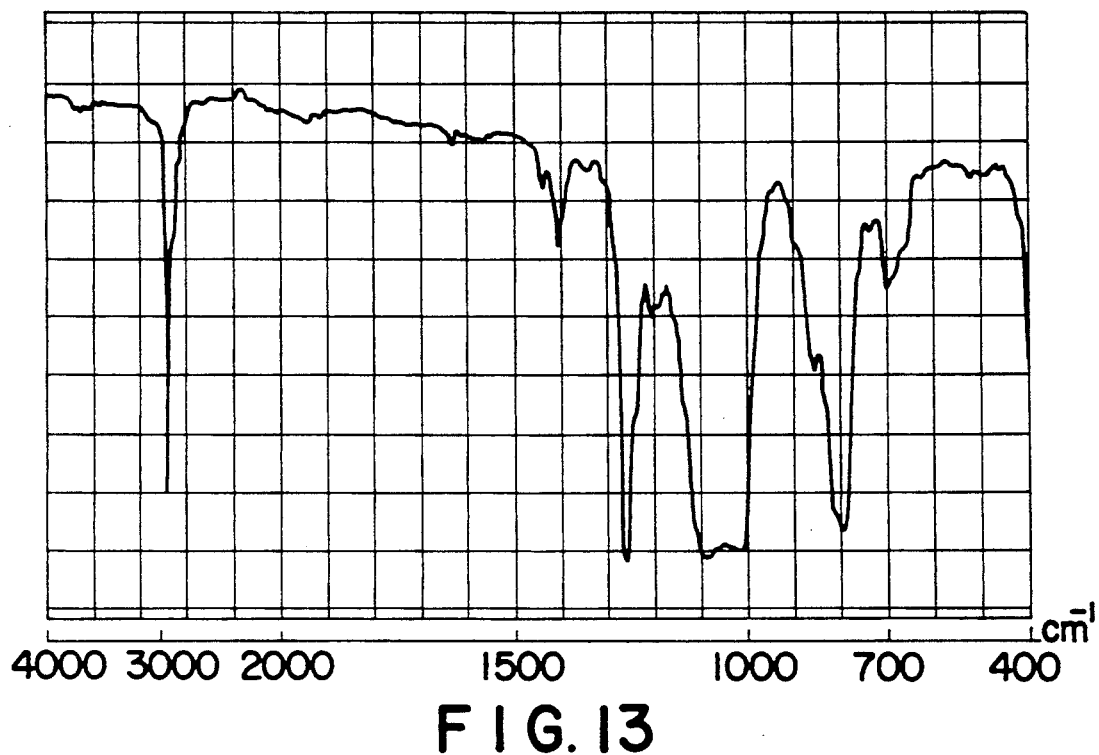

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{1}$ (Si—O)
An IR chart is shown in FIG. 13.
Molecular weight determined by the GPC technique with polystyrene standards (toluene):
Number average molecular weight (Mn)—3430
Weight average molecular weight (Mw)—4090
Dispersity (Mw/Mn)—1.2
Viscosity (25° C.)—35 centipoise

EXAMPLE 13

Preparation of a polydimethylsiloxane having a tridecafluoro-1,1,2,2-tetrahydrooctyl group at the $\alpha$-position and a methylphenylvinylsilyl group at the $\omega$-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N$_2$ gas, and 0.27 ml (1.5 moles/l) of a butyl lithium hexane solution was then added thereto and polymerization was performed at 20° C. for 15 hours.

Next, 8.26 g (0.0452 mole) of methylphenylvinylchlorosilane and 0.70 g (0.0069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):

2970 cm⁻¹ (C—H)
1260 cm⁻¹ (Si—CH₃)
1250-1150 cm⁻¹ (CF₂, CF₃)
1120-1050 cm⁻¹ (Si—O)
730 cm⁻¹

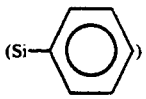

Figure 14:
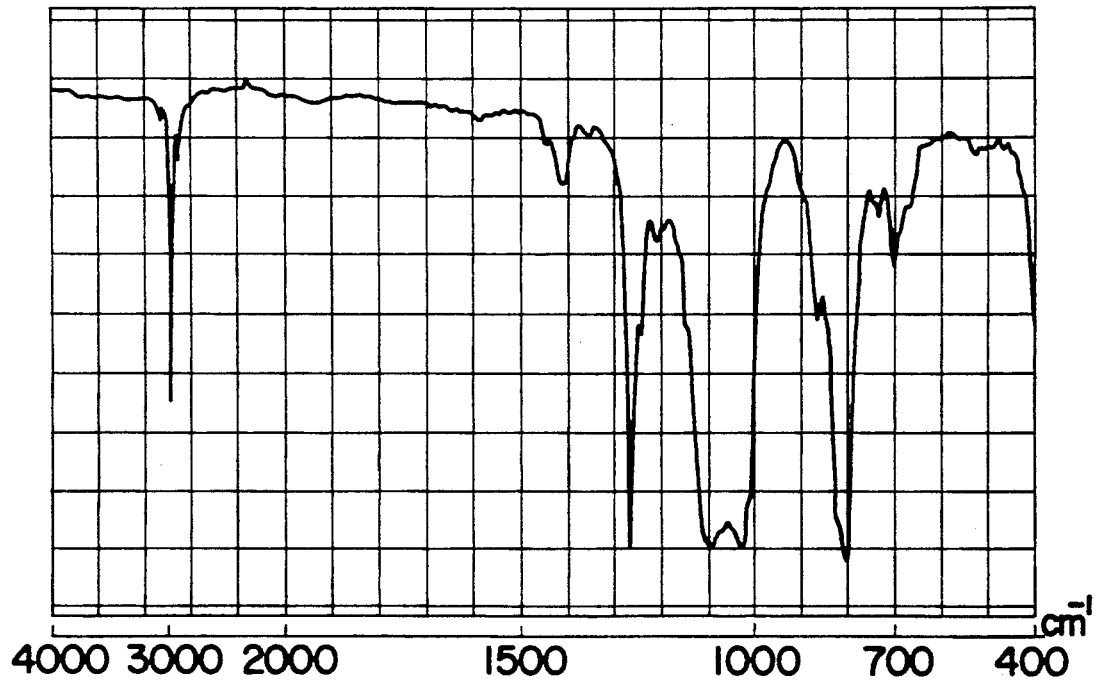

An IR chart is shown in FIG. 14.

Molecular weight determined by the GPC technique with polystyrene standards (toluene):
Number average molecular weight (Mn)—3100
Weight average molecular weight (Mw)—3820
Dispersity (Mw/Mn)—1.2
Viscosity (25° C.)—38 centipoise

EXAMPLE 14

Preparation of a polydimethylsiloxane having a tridecafluoro-1,1,2,2-tetrahydrooctyl group at the α-position and a diphenylvinylsilyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N₂ gas, and 0.27 ml (1.5 moles/l) of a butyl lithium hexane solution was then added thereto and polymerization was performed at 20° C. for 15 hours.

Next, 11.1 g (0.0452 mole) of diphenylvinylchlorosilane and 7.0 g (0.069 mole) of triethylamine was further added thereto, followed by stirring for 1 hour in order to bring the polymerization to an end. The thus synthesized material was then transferred to a separating funnel, then washed 5 with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained dimethylsiloxane, analytical results of IR spectrum, GPC (gel permeation chromatography) and viscosity were as follows:

IR (KBr):
2970 cm⁻¹ (C—H)
1260 cm⁻¹ (Si—CH₃)
1250-1150 cm⁻¹ (CF₂, CF₃)
1120-1050 cm⁻¹ (Si—O)
730 cm⁻¹

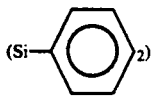

Figure 15:
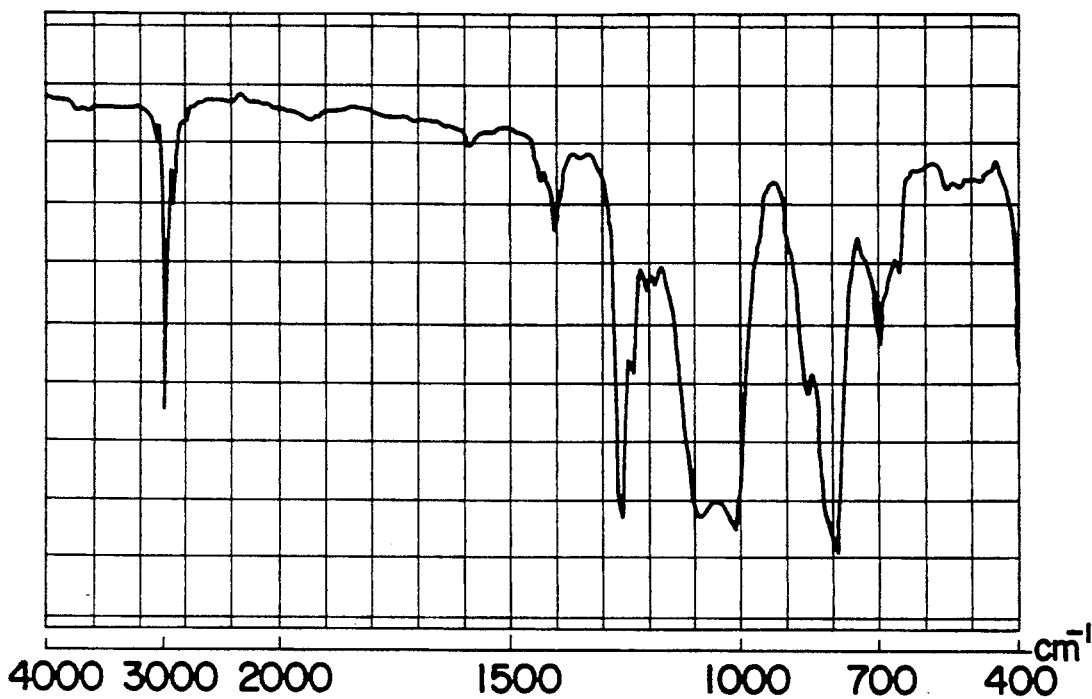

An IR chart is shown in FIG. 15.

Molecular weight determined by the GPC technique with polystyrene standards (toluene):
Number average molecular weight (Mn)—3520
Weight average molecular weight (Mw)—4280
Dispersity (Mw/Mn)—1.2
Viscosity (25° C.)—45 centipoise

EXAMPLE 15

Preparation of a polydimethylsiloxane having a tridecafluoro-1,1,2,2-tetrahydrooctyl group at the α,α"-positions and an ethylvinylsilyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under N₂ gas, and 0.27 ml (1.5 moles/l) of a butyl lithium hexane solution was then added thereto and polymerization was performed at 20° C. for 15 hours.

Next, 3.50 g (0.0226 mole) of ethylvinyldichlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

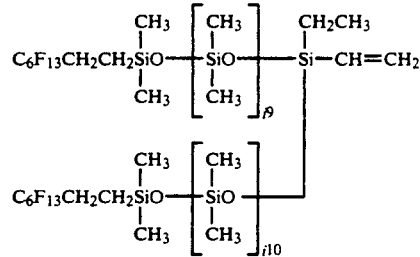

Figure 16:
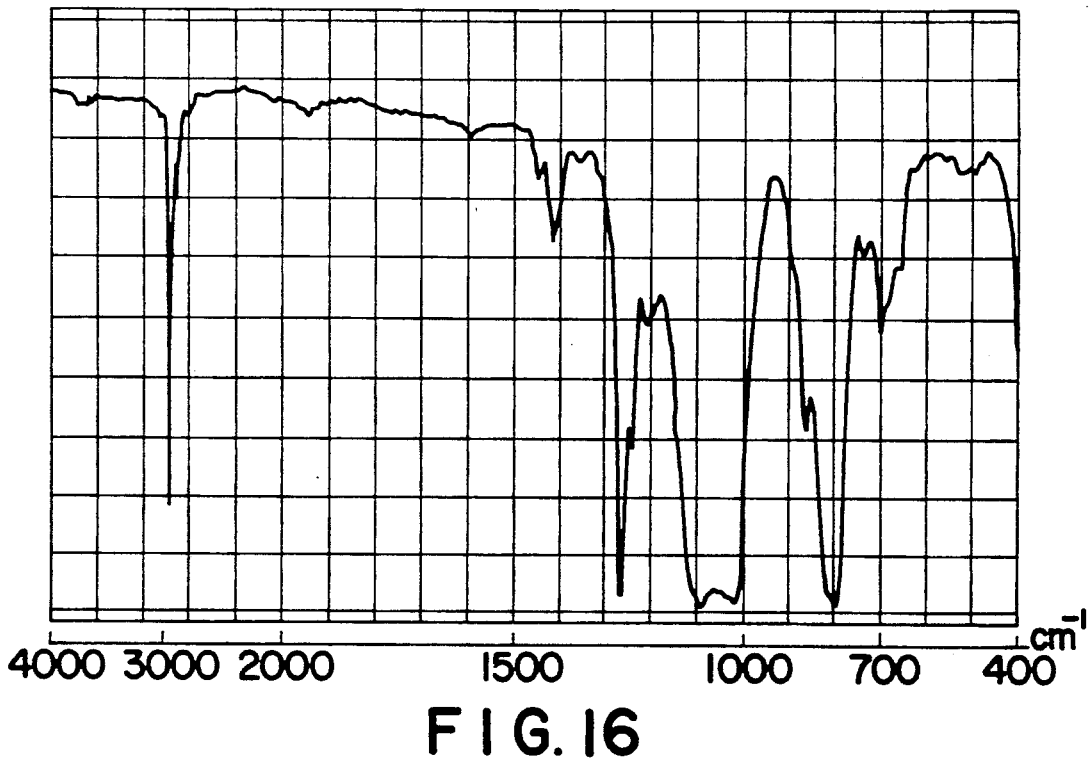

IR (KBr):
2970 cm⁻¹ (C—H)
1260 cm⁻¹ (Si—CH₃)
1250-1150 cm⁻¹ (CF₂, CF₃)
1120-1050 cm⁻¹ (Si—O)
An IR chart is shown in FIG. 16.

Molecular weight determined by the GPC technique with polystyrene standards (toluene):
Number average molecular weight (Mn)—6420
Weight average molecular weight (Mw)—7280
Dispersity (Mw/Mn)—1.1
Viscosity (25° C.)—75 centipoise As a result of calculation in accordance with the previously mentioned formula, wherein the number average molecular weight is 6,420, $i^9 = i^{10} = 37$.

EXAMPLE 16

Preparation of a polydimethylsiloxane having a tridecafluoro-1,1,2,2-tetrahydrooctyl group at the α-position and a methacryloxypropyl group at the ω-position:

To a 1-liter three-necked round bottom flask equipped with a stirrer and a cooling device were fed 100 ml of previously dried tetrahydrofuran, 17.3 g (0.0411 mole) of (tridecafluoro-1,1,2,2-tetrahydrooctyl)dimethylsilanol and 106.0 g (0.476 mole) of hexamethylcyclotrisiloxane under $N_2$ gas, and 0.27 ml (1.5 moles/l) of a butyl lithium hexane solution was then added thereto and polymerization was performed at 20° C. for 15 hours.

Next, 9.98 g (0.0452 mole) of 3-methacyloxypropyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1720 cm$^{-1}$ (C=O)
1260 cm$^{-1}$ (Si—CH$_3$)
1250-1150 cm$^{-1}$ (CF$_2$, CF$_3$)
1120-1050 cm$^{-1}$ (Si—O)

Figure 17:
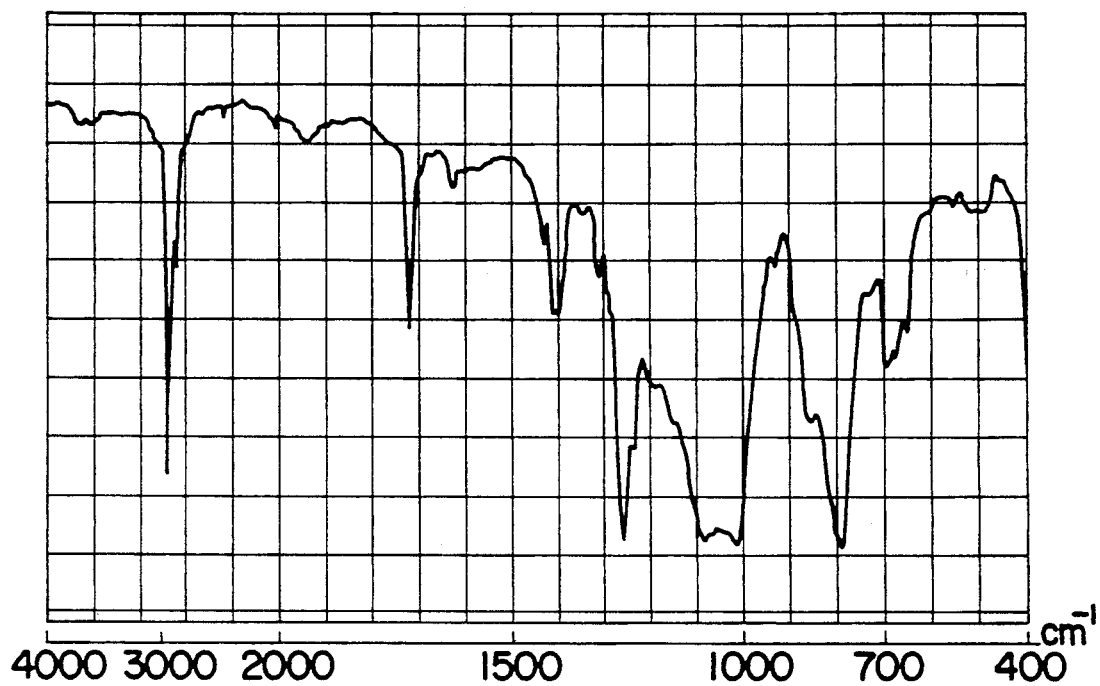

An IR chart is shown in FIG. 17.

Molecular weight determined by the GPC technique with polystyrene standards (toluene):
Number average molecular weight (Mn)—3370
Weight average molecular weight (Mw) 4050
Dispersity (Mw/Mn)—1.2
Viscosity (25° C.)—37 centipoise

EXAMPLE 17

Preparation of a polydimethylsiloxane having a heptadecafluoro-1,1,2,2-tetrahydrodecyl group at the α-position and a methacryloxypropyl group at the ω-position:

To a 2-liter three-necked round bottom flask equipped with a stirrer and a cooling device were fed 300 ml of previously dried tetrahydrofuran, 21.5 g (0.0411 mole) of (heptadecafluoro-1,1,2,2-tetrahydrodecyl)dimethylsilanol and 300.5 g (1.35 mole) of hexamethylcyclotrisiloxane under $N_2$ gas, and 0.27 ml (1.5 moles/l) of a butyl lithium hexane solution was then added thereto and polymerization was performed at 20° C. for 20 hours.

Next, 9.98 g (0.0452 mole) of 3-methacyloxypropyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1720 cm$^{-1}$ (C=O)
1260 cm$^{-1}$ (Si—CH$_3$)
1250-1150 cm$^{-1}$ (CF$_2$, CF$_3$)
1120-1050 cm$^{-1}$ (Si—O)

Figure 18:
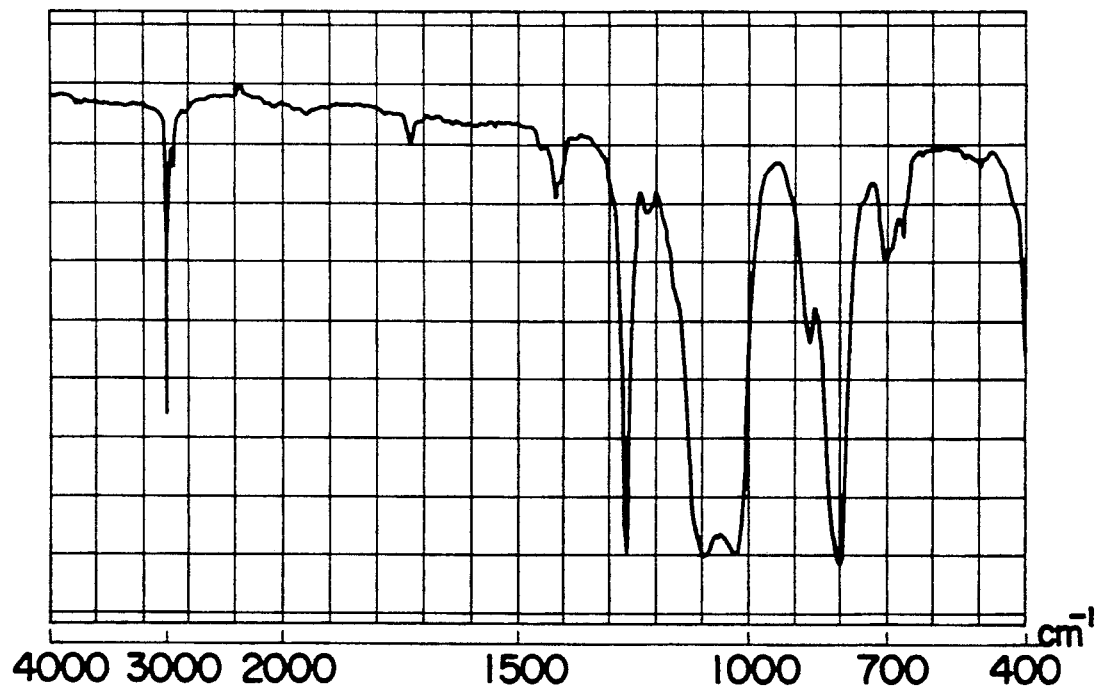

An IR chart is shown in FIG. 18.

Molecular weight determined by the GPC technique with polystyrene standards (toluene):
Number average molecular weight (Mn)—9810
Weight average molecular weight (Mw)—10850
Dispersity (Mw/Mn)—1.1
Viscosity (25° C.) 127 centipoise

EXAMPLE 18

Preparation of a polydimethylsiloxane having a pentafluorophenyl group at the α-position and a methacryloxypropyl group at the ω-position:

To a 2-liter three-necked round bottom flask equipped with a stirrer and a cooling device were fed 300 ml of previously dried tetrahydrofuran, 9.96 g (0.0411 mole) of (pentafluorophenyl)dimethylsilanol and 311.6 g (1.40 mole) of hexamethylcyclotrisiloxane under $N_2$ gas, and 0.27 ml (1.5 moles/l) of a butyl lithium hexane solution was then added thereto and polymerization was performed at 20° C. for 20 hours.

Next, 9.98 g (0.0452 mole) of 3-methacyloxypropyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1720 cm$^{-1}$ (C=O)
1260 cm$^{-1}$ (Si—CH$_3$)
1250-1150 cm$^{-1}$ (CF$_2$, CF$_3$)
1120-1050 cm$^{-1}$ (Si—O)

Figure 19:
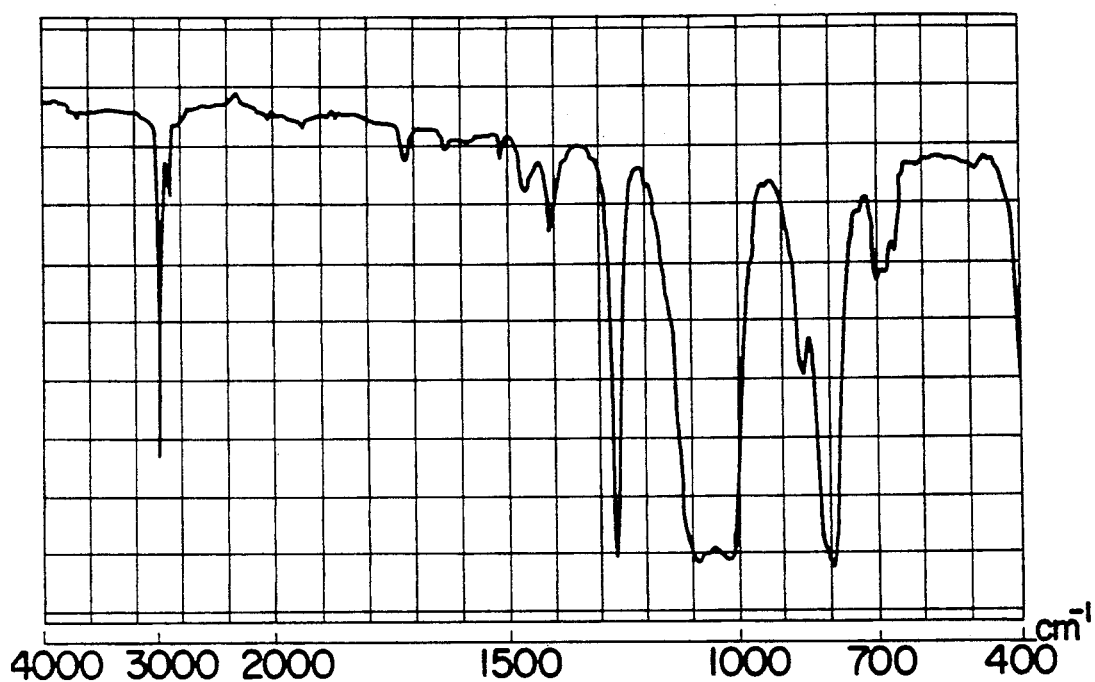

An IR chart is shown in FIG. 19.

Molecular weight determined by the GPC technique with polystyrene standards (toluene):
Number average molecular weight (Mn)—8730
Weight average molecular weight (Mw)—9960
Dispersity (Mw/Mn)—1.1
Viscosity (25° C.) 98 centipoise

EXAMPLE 19

Preparation of a polydimethylsiloxane having a tridecafluoro-1,1,2,2-tetrahydrooctyl group at the α-position and an ethenylphenyl group at the ω-position:

To a 1-liter three-necked round bottom flask equipped with a stirrer and a cooling device were fed 100 ml of previously dried tetrahydrofuran, 17.3 g (0.0411 mole) of 5 (tridecafluoro-1,1,2,2-tetrahydrooctyl)dimethylsilanol and 106.0 g (0.476 mole) of hexamethylcyclotrisiloxane under $N_2$ gas, and 0.27 ml (1.5 moles/l) of a butyl lithium hexane solution was then added thereto and polymerization was performed at 20° C. for 15 hours.

Next, 8.89 g (0.0452 mole) of p-ethenylphenyldimethylchlorosilane and 7.0 g (0.069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Figure 20:
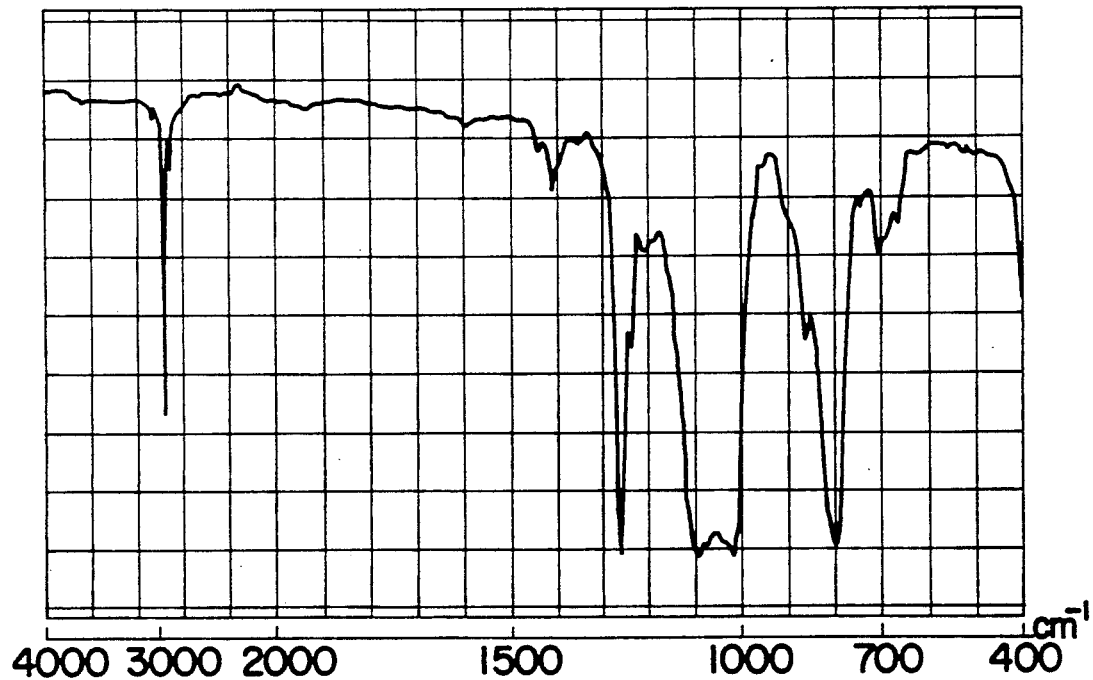

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 20.

Molecular weight determined by the GPC technique with polystyrene standards (toluene):
Number average molecular weight (Mn)—3360
Weight average molecular weight (Mw)—4150
Dispersity (Mw/Mn)—1.2
Viscosity (25° C.) 38 centipoise

EXAMPLE 20

Preparation of a polydimethylsiloxane having a 3-(heptafluoroisopropoxy)propyl group at the α-position and a vinyl group at the ω,ω'-positions:

To a 100-milliliter three-necked round bottom flask equipped with a stirrer and a cooling device were fed 10 ml of previously dried tetrahydrofuran, 0.42 g (0.00411 mole) of vinyldimethylsilanol and 0.92 g (0.0415 mole) of hexamethylcyclotrisiloxane under N$_2$ gas, and 2.7 ml (1.5 moles/l) of a butyl lithium hexane solution was then added thereto and polymerization was performed at 20° C. for 5 hours.

Next, 0.77 g (0.00226 mole) of 3-(heptafluoroisopropoxy)propylmethyldichlorosilane and 0.70 g (0.0069 mole) of triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Figure 21:
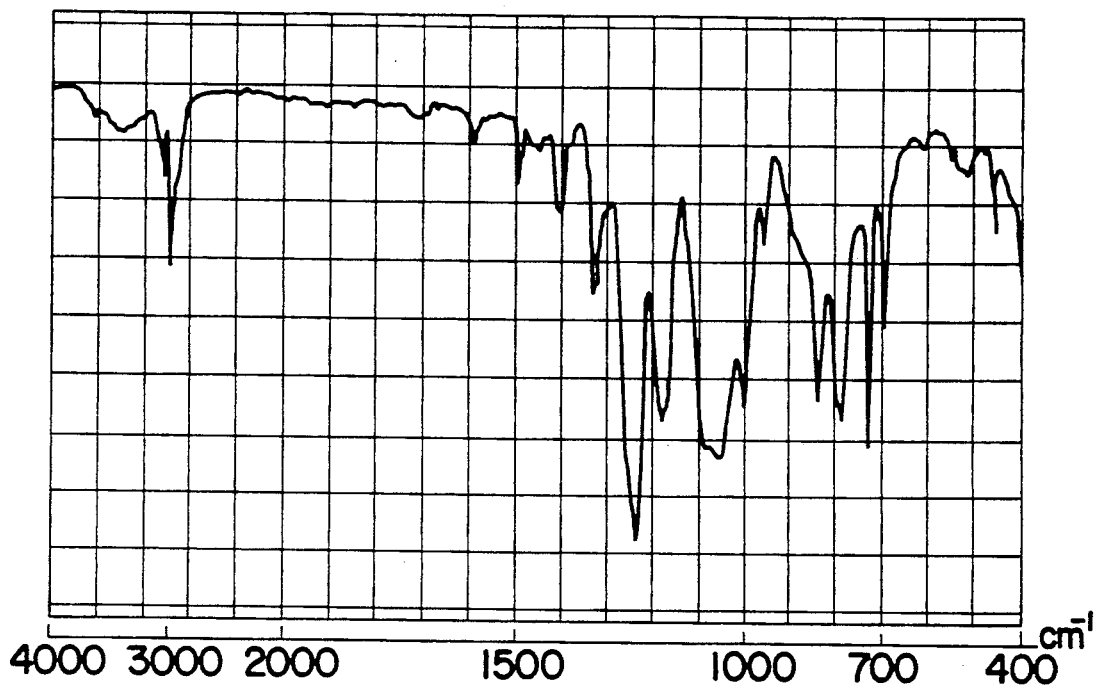

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum and GPC (gel permeation chromatography) were as follows:

IR (KBr):
2970 cm$^{-1}$ (C—H)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 21.

Molecular weight determined by the GPC technique with polystyrene standards (toluene):
Number average molecular weight (Mn)—520
Weight average molecular weight (Mw)—630
Dispersity (Mw/Mn)—1.2

EXAMPLE 21

Preparation of a polydimethylsiloxane having a tridecafluoro-1,1,2,2-tetrahydrooctyl group at the α-position and a vinyl group at the ω,ω',ω''-positions:

To a 500-milliliter three-necked round bottom flask equipped with a stirrer and a cooling device were fed 40 ml of previously dried tetrahydrofuran, 0.42 g (0.00411 mole) of vinyldimethylsilanol and 39.0 g (0.175 mole) of hexamethylcyclotrisiloxane under N$_2$ gas, and 27 μl (1.5 moles/l) of a butyl lithium hexane solution was then added thereto and polymerization was performed at 20° C. for 20 hours.

Next, 0.73 g (0.00151 mole) of (tridecafluoro-1,1,2,2-tetrahydrooctyl)trichlorosilane and 0.70 g (0.0069 mole) triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate.

Afterward, low-boiling substances in the resulting reaction product were distilled off under conditions of 100° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

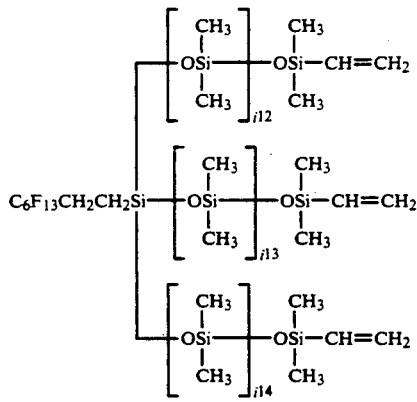

Figure 22:
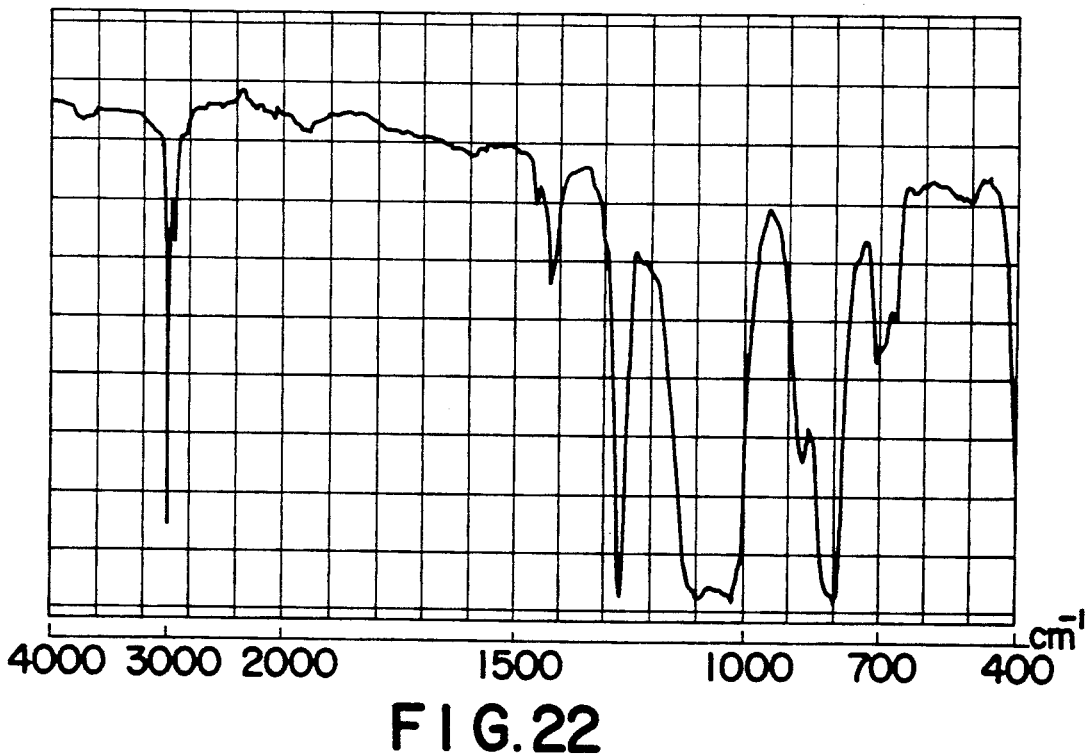

IR (KBr):
2970 cm$^{-1}$ (C—H)
1610 cm$^{-1}$ (Si—CH=CH$_2$)
1260 cm$^{-1}$ (Si—CH$_3$)
1250–1150 cm$^{-1}$ (CF$_2$, CF$_3$)
1120–1050 cm$^{-1}$ (Si—O)
An IR chart is shown in FIG. 22.

Molecular weight determined by the GPC technique with polystylene standards (toluene):
Number average molecular weight (Mn)—34120
Weight average molecular weight (Mw)—38770
Dispersity (Mw/Mn)—1.1
Viscosity (25° C.)—686 centipoise The repeating units $i^{12}$, $i^{13}$ and $i^{14}$ can be calculated in the same manner as in Example 1. The compound prepared in this example can be calculated as follows:

$i^{12}$=(number average molecular weight—molecular weight of moiety D—molecular weight of moiety F)/[molecular weight of three moieties E(=74.2×3)]

wherein the moieties D, E and F are as follows:

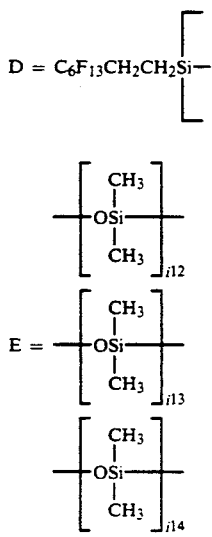

and

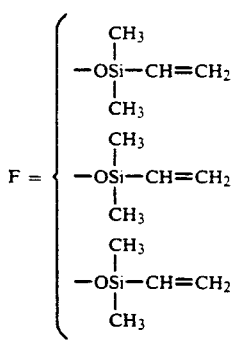

In this case, the molecular weight of the moiety F is the total weight of the three siloxane terminal substituents, and that of the moiety E is also the total of the three groups. Each value of $i^{13}$ and $i^{14}$ is the same as an average value of $i^{12}$ obtained by the calculation.

As a result of the calculation in accordance with the above formula in which the average molecular weight was 34, 120, $i^{12}=i^{13}=i^{14}=150$.

EXAMPLE 22

Preparation of a polydimethylsiloxane having a tridecafluoro-1,1,2,2-tetrahydrooctyl group at the α-position and a 3-methacryloxypropyl group at the ω,ω',ω''-positions:

To a 500-milliliter three-necked round bottom flask equipped with a stirrer and a cooling device were fed 10 ml of previously dried tetrahydrofuran, 0.83 g (0.00411 mole) of 3-methacryloxypropyldimethylsilanol and 3.49 g (0.0157 mole) of hexamethylcyclotrisiloxane under N₂ gas, and 27 μl (1.5 moles/l) of a butyl lithium hexane solution was then added thereto and polymerization was performed at 20° C. for 15 hours.

Next, 0.727 g (0.00151 mole) of (tridecafluoro-1,1,2,2-tetrahydrooctyl)trichlorosilane and 0.70 g (0.0069 mole triethylamine was further added thereto, followed by stirring for 1 hour in order to bring the polymerization to an end. The thus synthesized material was then transferred to a separating funnel, then washed with water to remove the resulting lithium chloride therefrom, and dried with anhydrous sodium sulfate. Afterward, low-boiling substances in the resulting reaction product were distilled off under conditions of ° C. and 10 mmHg over 2 hours, thereby obtaining a desired polydimethylsiloxane in a substantially quantitative yield. With regard to the thus obtained polydimethylsiloxane, analytical results of IR spectrum, GPC (gel permeation chromatography) and viscosity were as follows, and it was confirmed that the obtained polydimethylsiloxane had the following structure:

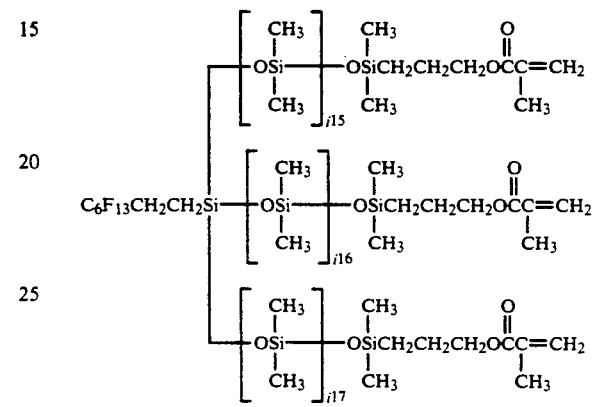

IR (KBr):
2970 cm⁻¹ (C—H)
1720 cm⁻¹ (C=O)
1260 cm⁻¹ (Si—CH₃)
1250–1150 cm⁻¹ (CF₂, CF₃)
1120–1050 cm⁻¹ (Si—O)

An IR chart is shown in FIG. 23.

Molecular weight determined by the GPC technique with polystyrene standards (toluene):
Number average molecular weight (Mn)—3510
Weight average molecular weight (Mw)—4300
Dispersity (Mw/Mn)—1.2
Viscosity (25° C.)—41 centipoise As a result of calculation in accordance with the previously mentioned formula, wherein the number average molecular weight was 3,510, $i^{15}=i^{16}=i^{17}=11$.

What is claimed is:

1. A polyorganosiloxane represented by the general formula (VII)

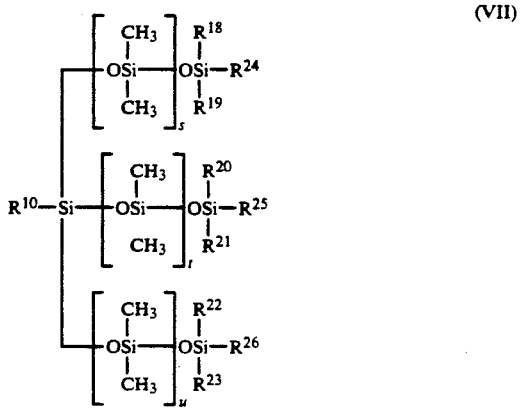

(VII)

wherein each of s, t and u is an integer of 1 to 2000, and $R^{10}$ is a pentafluorophenyl group, 3-(heptafluoroisopropoxy)propyl group, 1,1,2,2-tetrafluoroethyl group or a substituent which is a straight-chain or branched fluoroalkyl group represented by the formula (IV)

$$C_b H_c F_{2b-c+1} \tag{IV}$$

wherein b is an integer of 3 to 18, and c is an integer of 0 to 2b, each of $R^{18}$, $R^{19}$, $R^{20}$, $R^{21}$, $R^{22}$ and $R^{23}$ is an alkyl group having 1 to 4 carbon atoms, phenyl group, vinyl group, allyl group or a substituent which is a straight-chain or branched alkenyl group having an unsaturated double bond at its terminal and represented by the formula (II)

$$CH_2=CHC_a H_{2a} \tag{II}$$

wherein a is an integer of 2 to 18, each of $R^{24}$, $R^{25}$ and $R^{26}$ is an alkyl group having 1 to 4 carbon atoms, vinyl group, allyl group, m-ethenylphenyl group, o-ethenylphenyl gruop, p-ethenylphenyl group, m-ethenylphenylmethyl group, o-ethenylphenylmethyl group, p-ethenylphenylmethyl group, β-(m-ethenylphenyl)ethyl group, β-(o-ethenylphenyl)ethyl group, β-(p-ethenylphenyl)ethyl group, a substituent having the formula (VIII)

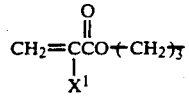
(VIII)

wherein X' is a hydrogen atom or a methyl group, or a substituent represented by the above-mentioned formula (II) but at least one of $R^{18}$ to $R^{26}$ is an unsaturated doubled bond-containing substituent of the above-mentioned groups.

2. A polyorganosiloxane according to claim 1 wherein the substituent represented by $R^{10}$ in the general formula (VII) is a 3,3,3-trifluoropropyl group, tridecafluoro-1,1,2,2-tetrahydrooctyl group, 3-(heptafluoroisopropoxy)propyl group, 1,1,2,2-tetrafluoroethyl group or heptadecafluoro-1,1,2,2-tetrahydrodecyl group.

3. A polyorganosiloxane according to claim 1 wherein the substituent represented by each of $R^{24}$, $R^{25}$ and $R^{26}$ in the general formula (VII) has the formula (VIII)

$$CH_2=C\underset{X^1}{C}CO(CH_2)_3 \tag{VIII}$$

wherein $X^1$ is a hydrogen atom or methyl group.

* * * * *